(12) United States Patent
Auad

(10) Patent No.: US 12,220,676 B2
(45) Date of Patent: Feb. 11, 2025

(54) PAINT-PRODUCTION SYSTEM WITH AUTOMATIC SELF-ADJUSTMENT OF PROPERTIES OF THE END PRODUCT, AND RELATED METHOD

(71) Applicant: Rogério Baptista Auad, Porto Alegre (BR)

(72) Inventor: Rogério Baptista Auad, Porto Alegre (BR)

( * ) Notice: Subject to any disclaimer, the term of this patent is extended or adjusted under 35 U.S.C. 154(b) by 820 days.

(21) Appl. No.: 17/439,651

(22) PCT Filed: Mar. 12, 2020

(86) PCT No.: PCT/BR2020/050084
§ 371 (c)(1),
(2) Date: Sep. 15, 2021

(87) PCT Pub. No.: WO2020/186323
PCT Pub. Date: Sep. 24, 2020

(65) Prior Publication Data
US 2022/0161210 A1    May 26, 2022

(30) Foreign Application Priority Data
Mar. 15, 2019    (BR) ...................... 10 2019 005047 0

(51) Int. Cl.
*B01F 33/84*    (2022.01)
*B01F 25/53*    (2022.01)
(Continued)

(52) U.S. Cl.
CPC ............ *B01F 33/846* (2022.01); *B01F 25/53* (2022.01); *B01F 27/88* (2022.01); *B01F 33/841* (2022.01);
(Continued)

(58) Field of Classification Search
CPC ....... B01F 33/846; B01F 2101/30; G06T 7/70
See application file for complete search history.

(56) References Cited

U.S. PATENT DOCUMENTS

| 4,893,939 A | 1/1990 | Burk |
| 6,494,608 B1 | 12/2002 | Retamal et al. |
| (Continued) | | |

FOREIGN PATENT DOCUMENTS

| CA | 2966918 A1 | 5/2016 |
| CN | 207899388 U | 9/2018 |
| (Continued) | | |

OTHER PUBLICATIONS

Search Report and Written Opinion from Application No. PCT/BR2020/050084 dated Jul. 13, 2020.
(Continued)

*Primary Examiner* — Elizabeth Insler
(74) *Attorney, Agent, or Firm* — Troutman Pepper Locke LLP; Ryan A. Schneider; Korbin M. Blunck

(57) ABSTRACT

A paint production system produced from pigment pastes and vehicles without prior adjustment. The system includes a volumetric dosing module endowed with automatic volumetric calibrators, at least one continuous processing module that includes a rotary mechanism that moves at least one tank between a mixing station, a continuous adjustment station integrated into a filling station, a cleaning station jointly with a manifold cleaning solvent mist generator and a control center that sends commands to be executed in the volumetric dosing module and continuous processing module units from a set of instructions in a computer program.

17 Claims, 40 Drawing Sheets

(51) Int. Cl.
*B01F 27/88* (2022.01)
*B01F 33/841* (2022.01)
*B01F 33/85* (2022.01)
*B01F 35/10* (2022.01)
*B01F 35/213* (2022.01)
*B01F 35/71* (2022.01)
*B01F 35/75* (2022.01)
*F28D 7/00* (2006.01)
*G05B 19/29* (2006.01)
*G05D 7/06* (2006.01)
*G06T 7/70* (2017.01)
*B01F 101/30* (2022.01)

(52) U.S. Cl.
CPC .......... *B01F 33/85* (2022.01); *B01F 35/1452* (2022.01); *B01F 35/213* (2022.01); *B01F 35/7176* (2022.01); *B01F 35/7547* (2022.01); *F28D 7/005* (2013.01); *G05B 19/29* (2013.01); *G05D 7/0635* (2013.01); *G06T 7/70* (2017.01); *B01F 2101/30* (2022.01); *G05B 2219/43193* (2013.01); *G06T 2207/30108* (2013.01)

(56) References Cited

U.S. PATENT DOCUMENTS

| | | | |
|---|---|---|---|
| 6,533,449 | B1 * | 3/2003 | Auad ................. B01F 35/2136 366/132 |
| 9,643,134 | B1 | 5/2017 | Mazzei et al. |
| 10,245,568 | B2 * | 4/2019 | Drocco ................. B01F 33/841 |

FOREIGN PATENT DOCUMENTS

| | | |
|---|---|---|
| DE | 20307083 U1 | 8/2003 |
| EP | 1428569 A2 | 6/2004 |
| WO | 9934905 A1 | 7/1999 |
| WO | 2015173688 A1 | 11/2015 |

OTHER PUBLICATIONS

Fritz, et al., "Putting Cameras in the Loop," Aug. 12, 2013 https://motion controltips.com/putting-cameras-in-the-loop>.

* cited by examiner

FIG. 21

PAINT-PRODUCTION SYSTEM WITH AUTOMATIC SELF-ADJUSTMENT OF PROPERTIES OF THE END PRODUCT, AND RELATED METHOD

CROSS-REFERENCE TO RELATED APPLICATIONS

This application is a National Stage of International Application No. PCT/BR2020/050084 filed 12 Mar. 2020, which claims benefit under 35 USC § 365 of BR Application No. 10 2019 005047 0 filed 15 Mar. 2019, each of which is incorporated herein by reference in its entirety as if set forth herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present patent of invention describes a production system for paint produced from pigment pastes and vehicles without prior adjustment, endowed with reading units and self-adjusting properties of a paint (such as color, viscosity, density, among others) that provide the correction parameters in the properties of the product so that the processing units, continuously, can automatically adjust the paint batches in accordance with the previously established specifications.

2. Description of Related Art

The term paint can be conceptualized as being a liquid, pasty or solid pigmented composition which, when applied in a thin layer (film) on a given surface, in the state in which it is supplied or after dilution, is convertible, after a certain time, into a solid, colored, translucent or opaque film.

The main constituents of a paint are: (a) resin, which is usually a translucent or transparent medium, where its main function is to promote the adhesion of the paint film on the substrate, also responsible for the wetting of pigments, aspects of brightness, chemical resistance, physical resistance, among others; (b) pigments and fillers that promote color development, film opacity, radiation resistance, optical properties, among others; (c) additives that give the film physical, chemical, rheological properties, among others; (d) solvents or thinners that are basically used to adjust the viscosity and applicability characteristics of the paint on the substrate, evaporating at the end of this process and enabling the curing/drying of the formed film.

Unlike dyes, pigments can be described as solid substances, finely divided and practically insoluble in the vehicle, which are used in the preparation of paints for the purpose of giving them color, opacity or other special characteristics. That is, they are used in order to modify the optical properties of a paint, as well as the properties of products incorporated into it. A relevant property that characterizes the pigments is the ability they have to allow the obtaining of the colors that one wishes to imitate, and their presence may also be necessary to obtain opacity, since the paints, for the most part, are used to cover the surfaces on which they are applied.

Worldwide, the paint manufacturing process makes use of low level of automation, in most situations operating with "pots" or tanks where the paint is produced in batches.

In terms of process, there are basically two concepts of paint manufacturing.

In the manufacturing concept entitled "machine paint", all the raw materials used in the paint to be produced (pigments, fillers, resins, solvents and additives) are added directly to a pot, mixed and subsequently taken to a mill to disperse the pigments and paint fillers in order to obtain the necessary "finesse", directly responsible for the brightness, the coating (opacity), and other characteristics, color, viscosity, etc. are subsequently adjusted in order to fit the product to the specifications.

In another concept of paint manufacturing, much more used and called "mixing paint", the paint is prepared by mixing previously prepared pigment pastes, adding resins, solvents and additives, so that the desired characteristics are obtained, then making adjustments in the characteristics so that the specifications of color, viscosity, coverage, etc., are met.

In this case, the pigment pastes are obtained from the dispersion, in high concentration, of a single pigment in a given vehicle, which are used for manufacturing a wide range of paints of different colors when combined with pastes of other pigments. The vehicle in this type of dispersion is a mixture of resins, solvents, additives and dispersing tensoactives, and these pigment pastes are processed through mills with varied technologies.

Considering that the families of paints are basically distinguished by the type of resin to be used in their formulation (acrylic, vinyl, polyester, alkyd, epoxy, etc.), and the type of resin having primary responsibility for the special characteristics for each paint family, some pigment pastes, depending on the characteristics of the vehicle used for its manufacture, have characteristics called "universal paste" or "universal concentrate", in view of the compatibility that these dispersions allow with virtually all other types of resins, and without affecting their final chemical physical characteristics for the paint obtained from this method. In this case, a single family of pigment pastes produced with these "universal vehicles" can serve a wide range of family of paints.

The cost, however, of "universal concentrates", in various situations, end up being more expensive due to the costs higher than the constituents of the "universal vehicle" (universal resins, solvents, additives, etc.), when compared with the base vehicle of the formulation of certain families of paints.

Thus, the paint industry, in more competitive paint families, end up opting for the creation of pigment paste families that use the same base vehicle of the product family or also opt for the manufacture of "semi-universal concentrates", capable of serving some product families, but with more compatible costs.

Accordingly, it is common for manufacturers to operate with more than one family of "pigment pastes" to serve the wide range of product families, thus maintaining the variable cost at minimum levels.

In this way, "mixing paints" have become the most productive way to manufacture a paint with enormous advantages over "machine paints", offering manufacturers enormous versatility in both product formulation and manufacturing productivity.

As for the characteristics of the pigment pastes used to obtain paints, in addition to the "universality" or not of the vehicle used for its manufacture, these can also be classified into two distinct categories.

A first category, which includes the adjusted pigment pastes or adjusted dyeing, the colorimetric properties are strictly controlled during the manufacturing process. In this case, variables such as "color position", "dyeing force", viscosity, density, etc., are previously adjusted before being released for consumption.

The most common cases in the use of this type of adjusted dyeing are observed in "paint mixing machines", used directly at points of sale to obtain a huge range of colors and shades, mainly for products destined to the market of architectural paints or automotive refinish.

In this case, previously adjusted "base vehicles" (with or without pigmentation) are dyed by dosing with pigment pastes adjusted, in paint mixing systems, directly at the point of sale.

Otherwise, there are also unadjusted pigment pastes or unadjusted dyeing, used in paint factories where colorimetric properties are not controlled.

In this type of product, viscosity and "finesse" are usually basically controlled, which ultimately represents the level of dispersion reached by a pigment paste when passing through a mill or disperser. This property has a methodology for quantification (Hegman gauge) through an equipment called "grindometer" and is directly related to the particle size distribution of pigments obtained through the grinding or dispersing process.

It worth noting, however, that the characteristics of "color position" and "dyeing power" in these pigment pastes, for direct use in paint factories, and in most cases, do not undergo previous adjustments, considering that the manufacturing process of most "mixing paints" provide for later steps of adjustment and quality control that should ensure the specifications of the end product, thus offsetting any deviations in the colorimetric properties of the pigment pastes used.

In this type of "mixing paint" process, most commonly used by paint manufacturers, operators perform the following steps of the process until the product finally reaches the quality specifications and subsequently receives authorization for packaging:

dosage, where usually an operator takes a pot (or fixed tanks, in the case of production of batches of large volume paint) to a weighing unit where the components of the paint (pigment pastes, resins, solvent and additives) are sequentially weighed into that container;

homogenization, where the pot is taken to a mixer and placed to homogenize for a certain period of time;

sampling, where a sample is taken to the laboratory for testing;

tests, where the paint properties are tested and the necessary adjustments are calculated to drive the product into the specifications. Usually the main characteristics to be adjusted are restricted to color, viscosity, coverage and density. Eventually, in special paints, some specific characteristics can still be controlled, such as brightness, PH, conductivity, among others.

adjustment, where components determined by the laboratory are added for the product to be adjusted;

homogenization and repetition of steps (c) to (e) until the product is adequate to the specifications;

filling;

washing, with the removal of the paint adhered to the pan or tank, avoiding contamination of the next batch.

The property adjustment cycle can take several hours, days or, in more critical cases, even weeks, since concomitantly, due to the large number of adjustments being conducted with other paints by the same laboratory, a "waiting line" is naturally created. Still, some tests are quite time consuming, such as color tests, where a panel needs to be previously painted, waiting for the drying time, only after color measurements are made.

Seeking to improve production performance, the state of the art describes equipment conventionally called "dispensing machines" or "mixing machines", which comprise large dosing machines, capable of automating the processes of dosing or weighing the components of a paint inside a pot or a tank.

Furthermore, the state of the art describes dosing machines that perform the dosage directly inside the final packages. However, this technical solution only has application in situations where the bases and dyeing used for the production of the paint are pre-adjusted, leading to end products entirely within the specifications (color, viscosity, density, coverage, etc.), considering that there is no final phase of quality control for the packaged product, the procedure being used in paint mixing systems, where the product is prepared directly at the point of sale.

With regard to the vast majority of dispensing machines used by paint manufacturers, where the previous adjustment of pigment pastes and other components is not performed, two difficulties involve the use of this type of machine. The first is related to the quality of the bases, pigment pastes and other components that will be dosed, which usually have specification ranges. However, these components undergo variations in their manufacturing batches that impact the batch of paint manufactured.

In the case of pigments, they have approval ranges in their chromatic characteristics and concentration (color position and dyeing power) which, when mixed, even within an exact proportion, will lead to color variations of the end products, results from the simple variation of the specifications comprised within the specification/approval ranges of these components, by their manufacturers. These pigments, for the most part, are supplied in powder form, and must previously be dispersed in mills or dispersers, mixed with vehicles composed of varnishes, resins, solvents, dispersants and other additives. In this process, the wetting and disaggregation of pigment particles will then occur, according to a process called dispersion where, depending on the severity, the pigment paste may develop a greater or lesser "dyeing power" that will directly affect the color characteristics of a paint produced through it, considering that the dyeing power is directly related to the particle size distribution of the pigments dispersed in the vehicles.

Therefore, the variability in the characteristics of a paint is related to the set of raw materials and the individual variability of the same, added to the variability of the processes through which they are obtained, also associated with other analytical and human errors introduced naturally in the procurement process.

Therefore, it is unlikely that a paint produced from components that do not have their characteristics previously adjusted will directly meet the specifications. Even if a simple dosage of the constituents occurs, it is usually necessary to make further adjustments.

Thus, the main obstacle to the use of dispensing machines in the process of automation of paint factories lies directly in the quality of the components (bases, resins, vehicles, pigment pastes or dyes and others), which necessarily need to be pre-adjusted in all its properties so that when dosed and subsequently mixed, the product obtained from this mixture meets the specifications.

The fact that the vast majority of dispensing machines used in paint factories are operating with unadjusted pigment bases and pastes greatly reduces productivity, because only the dosage step is automated, and all other steps are required. As the dosage stage corresponds to less than 10% of the total time of the "lead time of production" the gains end up having little impact.

The second difficulty associated with dispensing machines concerns the dosage technology that can be gravimetric or volumetric. In the case of gravimetric dosage, each component is dosed individually, on scales or high-precision load cells, with the dosage performed with great accuracy, but making the process relatively slow and providing a low productivity. In the volumetric dosage, they have higher productivity, considering that the dosage of the components of the formulation is performed simultaneously. However, these equipment do not have as high reliability as gravimetric systems, due to problems related to dosage volumetry, which are made by dosing pumps that require periodic calibrations which, due to wear, change the amount of material displaced for each rotation. Apart from such variations, other variables directly affect the dosage accuracy, such as: variations in the viscosity/density/temperature of the components, pressures in the lines, room temperature, among others. These variables alone significantly alter the dosage accuracy, limiting the use of this type of equipment.

In order to minimize these factors, these machines with volumetric technology usually incorporate a calibration routine, the error between what should be dosed and what was actually dosed being measured, providing a "correction factor" that changes the parameter that relates the rotation of the dosing pump with the dosed grams.

However, this process is relatively slow and laborious, having to be done at a certain frequency and individually for each component, which becomes a major problem, especially when these machines are designed to dose dozens of components.

Additionally, due to "production pressure", it is quite usual that the operators responsible for this procedure end up relaxing in these routines and, consequently, the products produced through these machines, even if their components have been pre-adjusted, end up having their characteristics "deteriorated" over time by the absence of fine-tuning, causing major quality disorders for companies.

The state of the art describes commercial or industrial dispensing machines, gravimetric or volumetric, which must have their bases, dyeing or dyes pre-adjusted, to produce paints with specified quality. Generally, mechanisms with tanks associated with dosage control units and pre-dosing equipment are described.

Document EP1428569 describes a device for dosing colored pigments that includes a plurality of tanks containing colored pigments and connected to a corresponding number of distribution nozzles, which are located in a coloring chamber. A scale is arranged in the coloring chamber and connected to a processing unit. By command on a panel, the type of product to be colored is selected.

Document U.S. Pat. No. 9,643,134 describes an automated mixing system for aqueous mixtures with a plurality of liquid additive control modules that each provide a desired amount of additive to a dedicated mixing injector to mix each additive with water to provide an accurate blend of additive and water. The system has the ability, between mixing cycles, to purge the components of the additive control modules with air and water to displace any residual additive that can remain in the control module. The system is controlled by a controller that controls an actuated control valve to achieve the desired flow rate of the liquid additive to acquire the desired proportion of liquid additive into the water.

Document CA2966918 describes a paint dispensing device having an accommodation with a rotating platform on the housing around a vertical shaft, having a plurality of stations on the turntable adapted to receive a paint dispenser with a plunger in which the movement of the plunger dispenses the paint from the paint dispenser. An indexing unit, after activation, rotates the turntable to sequentially position the stations in a distribution position. When in the distribution position, an actuator mounted on the housing mechanically fits the plunger of the paint dispenser positioned in the distribution station. A receptacle is mounted on the housing below the turntable and aligned with the distribution position. A controller is then coupled to the indexing trigger and is programmed to sequentially move the stations for alignment with the distribution station and, when at the distribution station, move the actuator to dispense paint from the paint distributor in the distribution position to the receptacle.

The document WO9934905 describes a machine for dosing fluid products, especially paint products, comprising a dispensing head with a nozzle, with which the ends of a plurality of distribution conduits communicate to feed a plurality of fluid products. Mixing media, in particular a rotating turbine, are mounted between the ends of the distribution ducts and the distribution nozzle to continuously mix the fluid products from the different distribution conduits and entering the dispensing head simultaneously.

Document CN207899388 describes a paint production equipment that includes a pigment tank, a solvent tank, both tanks endowed with a solenoid dosing valve, having a flow meter installed below the dosing solenoid valve.

Document DE20307083 describes a device with two storage containers containing the base materials, a calculation unit to control a dosing unit for the materials, and a dosing unit to metrically or volumetrically dose the materials. Storage containers are formed as cartridges to empty the base materials and reclose using a clasp. The dosing unit has a holder to receive a storage container released by the clasp. The bracket is supplied with a pressure unit to empty the base material and a mixing unit is arranged inside the holder.

Document U.S. Pat. No. 6,494,608, by the same author, describes a continuous paint manufacturing process, in which components are continuously injected into a mixer, having their properties adjusted continuously. Due to its conception, this process uses the artifice of introducing all components of the formulation directly into the mixing unit, simultaneously and continuously, which makes its implementation cost extremely high and its flexibility reduced, limiting its application to a single product line and with few components in the formulation.

Thus, the state of the art does not describe or suggest any system that allows the automatic adjustment of the properties of the constituents of a paint formulation, using a volumetric dispensing machine with means for reading and self-adjusting the characteristics and properties of a paint, produced from pigment pastes and vehicles without prior adjustment and that, from these controls and automatic property adjustments, produce lots of paint within previously established specifications, eliminating several conventional steps in paint manufacturing processes.

BRIEF SUMMARY OF THE INVENTION

The invention describes a paint production system with automatic adjustment of the properties of the end product, such as color, viscosity, density, coverage, pH, conductivity, among others, added to the fact that it uses the knowledge acquired in the adjustment of the previous batch to automatically change the starting formulation of subsequent production lots of that same product, seeking to progressively reduce the time to achieve the specification and cost of constituent materials of the product for future batches.

The invention describes a paint production system with automatic adjustment of the properties of the end product endowed with a doser with 100% automated calibration and programmable.

The invention describes a paint production system with automatic adjustment of the properties of the end product endowed with a color analyzer in wet basis, based on a reading cell specially designed for color reading of liquid paints, which performs measurements of this property through spectrophotometry by the reflection method for paints and correlates still in liquid form, enabling the characterization and reproduction through corrections made by adding dyeing, solvents, additives, among others, thus meeting the specifications required for the material in process, before the beginning of the packaging process.

The invention describes a paint production system with automatic adjustment of the properties of the end product endowed with a sensor of multiple variables, such as density, viscosity, temperature, mass flow and volumetric flow, which operates by the Coriolis principle, which makes measurements of these properties for paints and correlates in liquid form, enabling adjustments of these properties through corrections made by adding solvents, vehicles or other components, thus meeting the specifications required for the material in process, before the start of the packaging process.

The invention describes a paint production system with automatic adjustment of the properties of the end product endowed with a system of monitoring operations by digital image processing (vision system) in place of conventional systems that use individual sensing, which, depending on the size of the installations and the classification of risk area for fires and explosions, can be extremely expensive.

The invention describes a paint production system with automatic adjustment of the properties of the end product endowed with dosing mechanisms using the concept of single drive, with shared central shaft and individual coupling of material dosing pumps, enabling the incorporation of dozens of dosing pumps in the same drive, providing high dosage accuracy, with high repeatability and reproducibility and low cost of implantation.

The invention describes a paint production system with automatic adjustment of the properties of the end product that uses a methodology of volume sizing of "process cycling tanks" to supply continuous processors in order to minimize the size of these tanks in order to decrease the volume of the minimum batch, aiming at reducing the stocks of finished products or even the production under the "just in time" demand regime.

The invention describes a paint production system with automatic adjustment of the properties of the end product with low cleaning setup of both continuous adjustment stations (CAS) and the filler module (MA) due to the low dead volumes in their chambers and cavities, facilitating cleaning and decontamination operations, through solvent mist and nitrogen propelled through the Cleaning Manifolds (CM).

The invention describes a paint production system with automatic adjustment of the properties of the end product endowed with a continuous mixer, described in document BR102018073022, of the same holder having undergone improvements, which, due to the small "dead volume" of the mixing chamber, compared to its flow capacity, makes the "response time" of changes in dosages and continuous mixtures of the adjustment components extremely low (of the order of seconds).

The invention describes a paint production system with automatic adjustment of the properties of the end product endowed with a module of measurement and color adjustment in wet track designed and developed for precise measurements of the color variable, in paints and correlates, in its characteristic "in natura" (liquid base), eliminating the need for the time-consuming application and drying processes, preceding the color measurement, involving conventional adjustment and quality control processes in the conventional paint industry.

The invention describes a paint production system with automatic adjustment of the properties of the end product that takes around 1 to 3 minutes for continuous processing units to meet the specifications of the material in process, having as direct dependence on how far away the product in question is from the centers of the quality specification ranges, reaching the minimum batch time (time for paint specifications to be met) in about 10 minutes, already taken into account all adjustment and packaging operations of the product under processing.

The invention describes a paint production process and correlates with automatic adjustment of the properties of the end product, where the amounts involved of materials used for adjustments are usually small, easy to be dosed continuously, through a single dosing pump for each adjustment component.

BRIEF DESCRIPTION OF THE DRAWINGS

The accompanying figures, which are incorporated in and constitute a part of this specification, illustrate several aspects described below.

FIG. 21 presents a table simulating the operation of a system endowed with a volumetric dosing module VDM with two continuous processing modules.

DETAIL DESCRIPTION OF THE INVENTION

Figure 1:
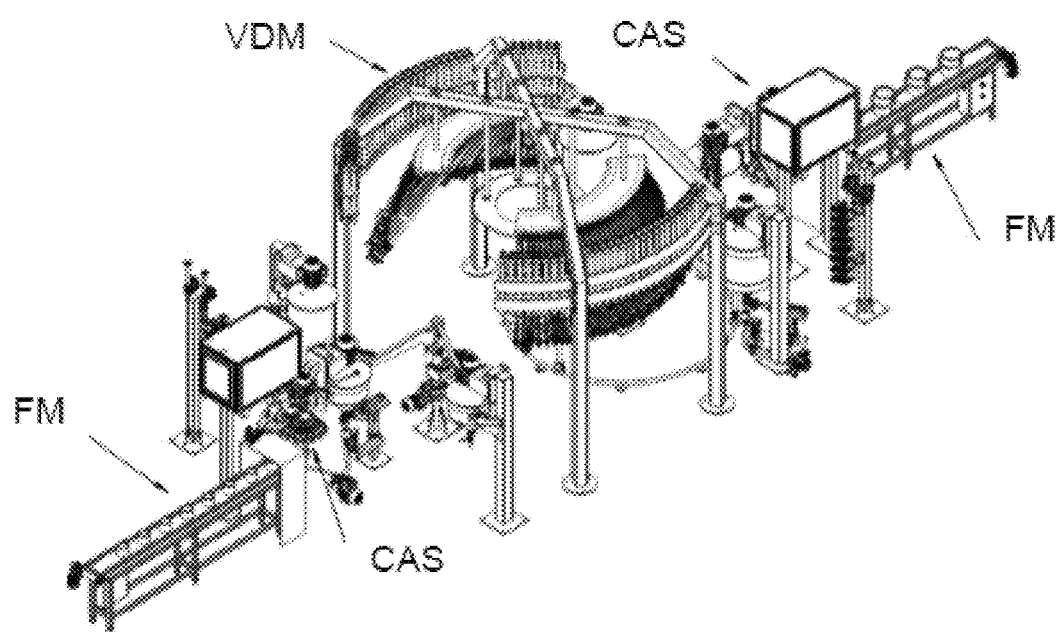
FIG. 1 shows the representation of the modules of the automatic paint production system with self-adjustment of properties of the end product.
Figure 2A:
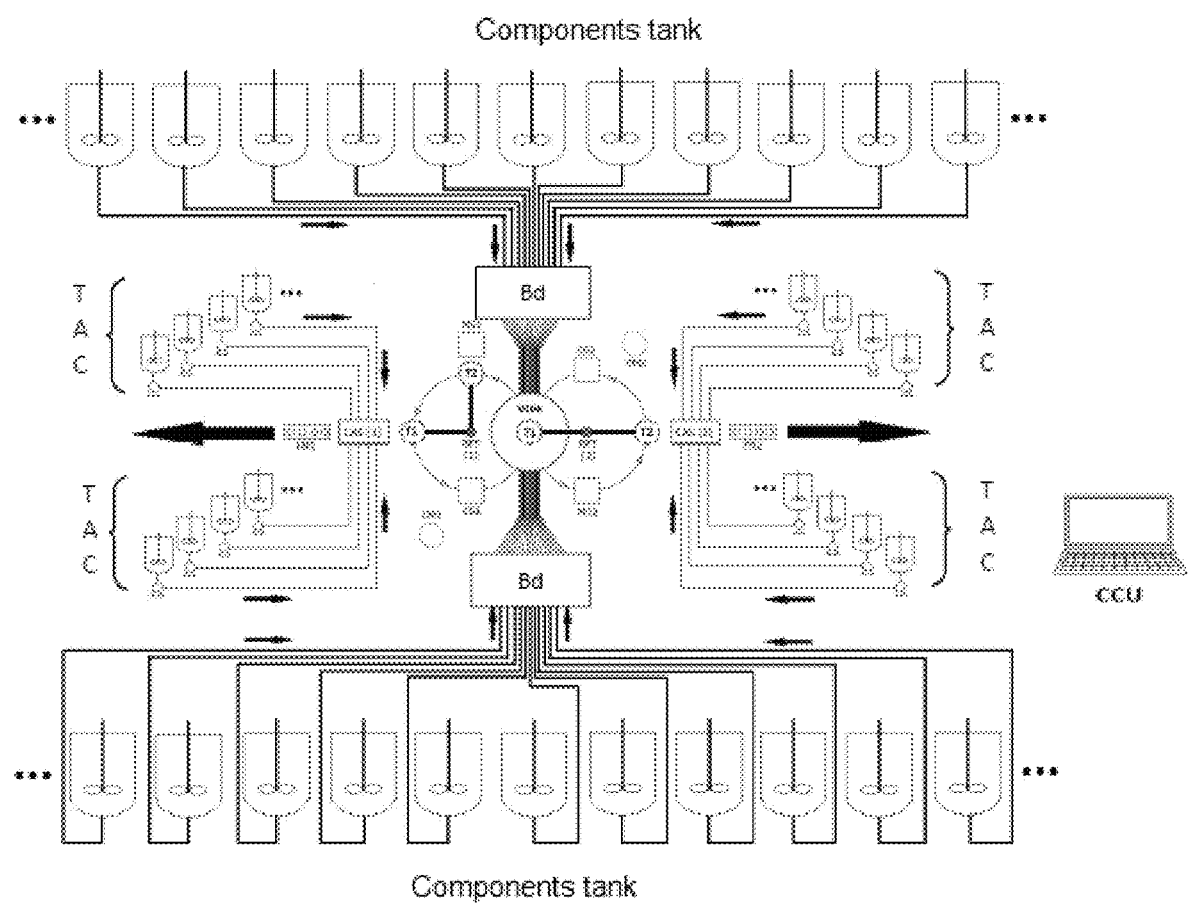
FIG. 2A shows the schematic representation of the automatic paint production system with self-adjustment of end product properties.
Figure 2B:
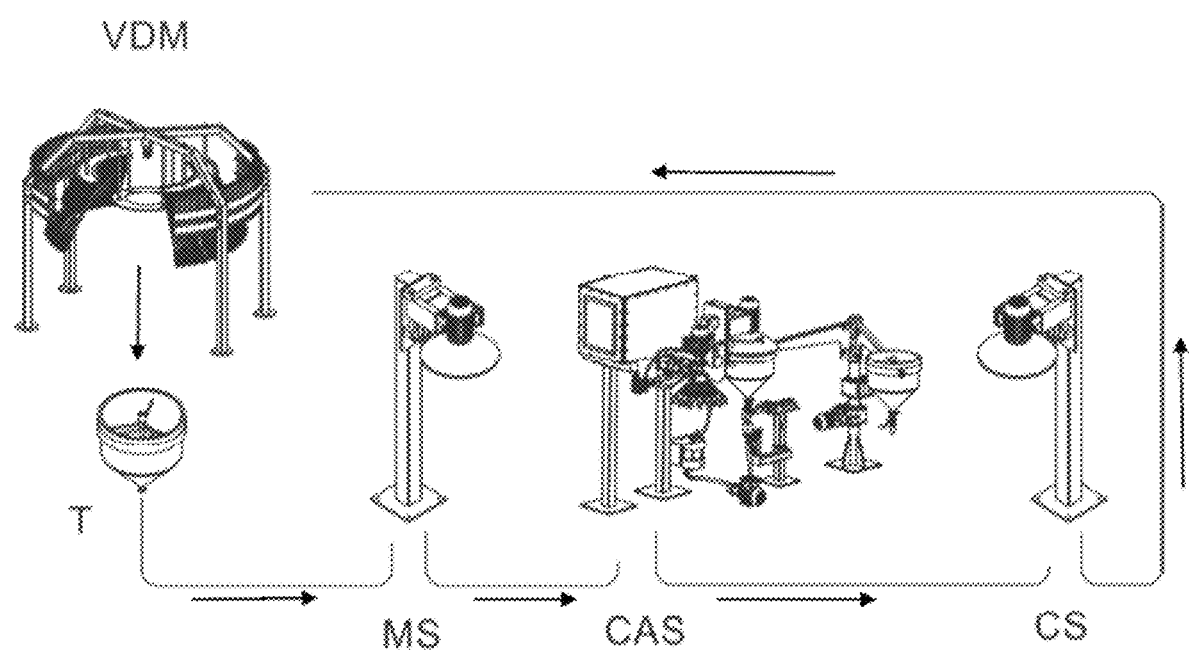
FIG. 2B presents a phase diagram of the paint production method with automatic self-adjustment of end product properties.

The paint production system with automatic self-adjustment of properties of the end product, object of this patent of invention, basically comprises a volumetric dosing module VDM endowed with automatic volumetric calibrators; at least one continuous processing module that includes a rotary mechanism RPT that moves at least one tank T between a mixing station MS, a continuous adjustment station CAS integrated into a filling station FM; a cleaning station CS jointly with a manifold cleaning solvent mist generator CM and a control center CCU that sends commands to be executed in the volumetric dosing module VDM and continuous processing module units from a set of instructions in a computer program, as shown in FIGS. 1 and 2A, 2B.

Figure 3A:
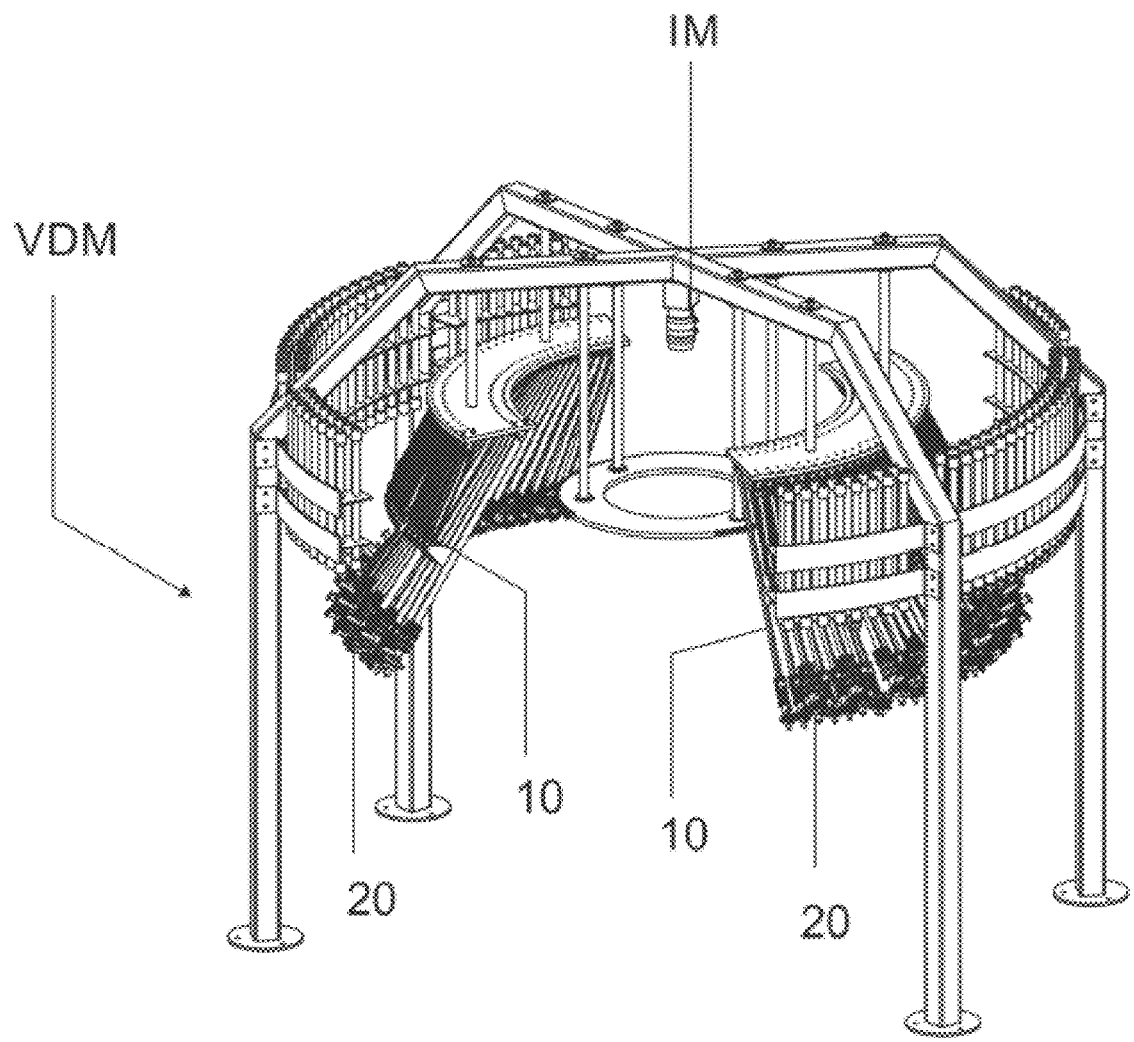
FIG. 3A presents the perspective view of the volumetric dosing module VDM, evidencing an image acquisition unit IM that provides data for the interlocking of the dosing process through digital image processing by the control center CCU.
Figure 3B:
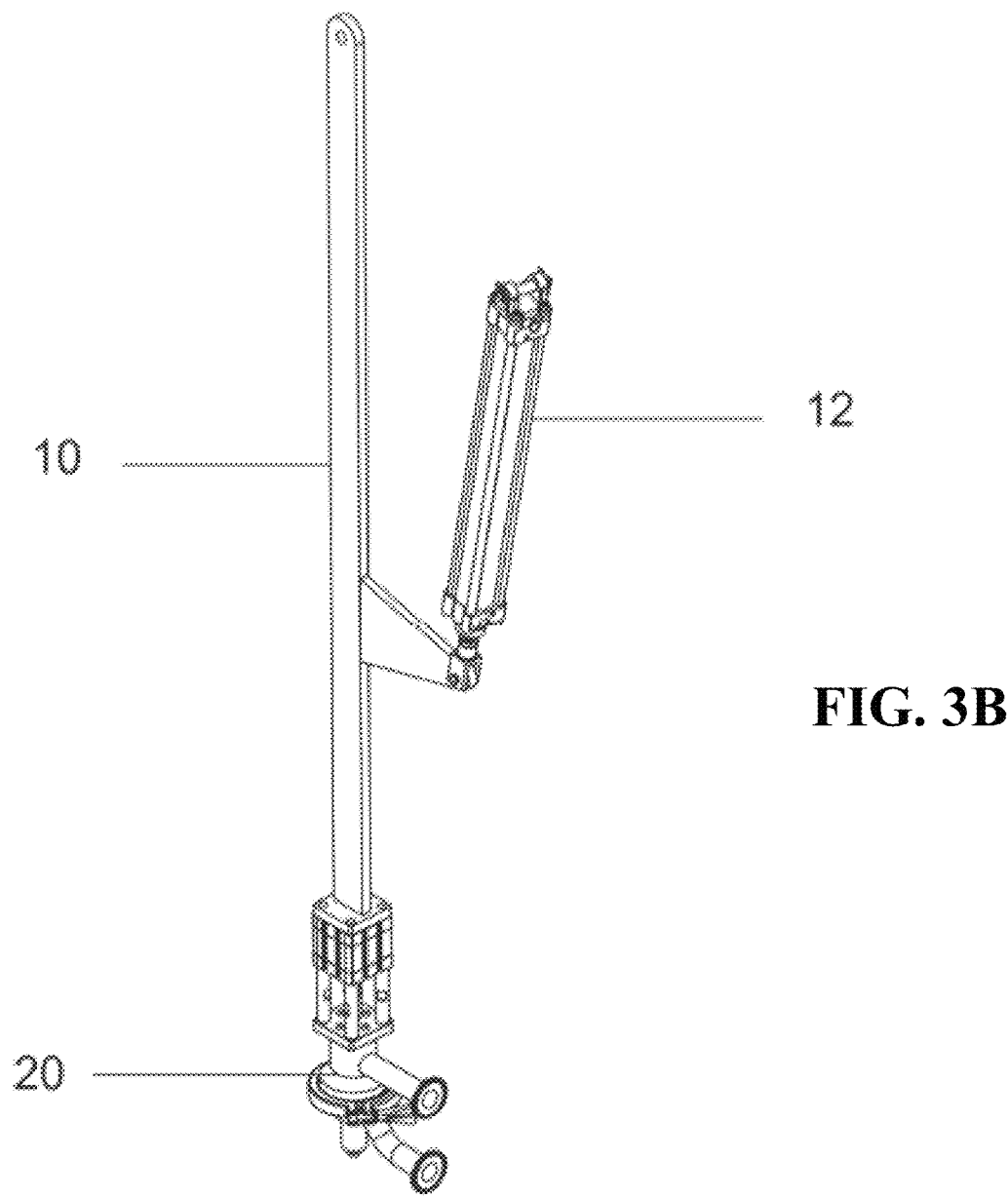
FIG. 3B presents the perspective view of the positioning arm set 10 and the dosing valve 20 of the volumetric dosing module VDM.

As shown in FIGS. 3A and 3B, the volumetric dosing module VDM comprises a set of arms 10 endowed with a lever mechanism driven by a pneumatic actuator 12 that moves the arm 10 by command received from the control center CCU, the arms 10 that present at the free end a dosing valve 20 that releases the specified amount of the component, as previously defined at the control center CCU.

The control center CCU activates the arms 10 equivalent to the components to be dosed in the tank T, followed by the alignment of the dosing valves 20 for the passage of the flow of the component stored in a supply tank TAC by means of a dosing pump Bd, the flow directed to the tank T of the continuous processing module until the quantity of the component specified in the formulation is reached, when the control center CCU aligns the dosing valves 20 to the recirculation position and returns the arms 10 to the starting position.

Figure 3C:
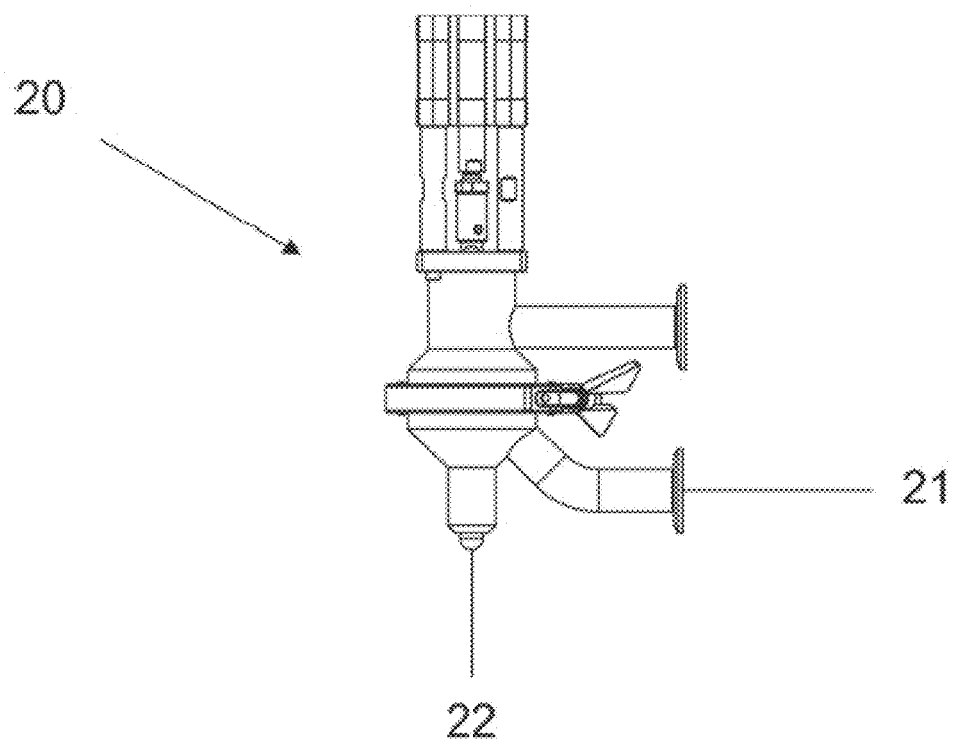
FIG. 3C shows the lateral view of the volumetric dosing module VDM dosing valve and FIG. 3D shows the view in section.
Figure 3D:
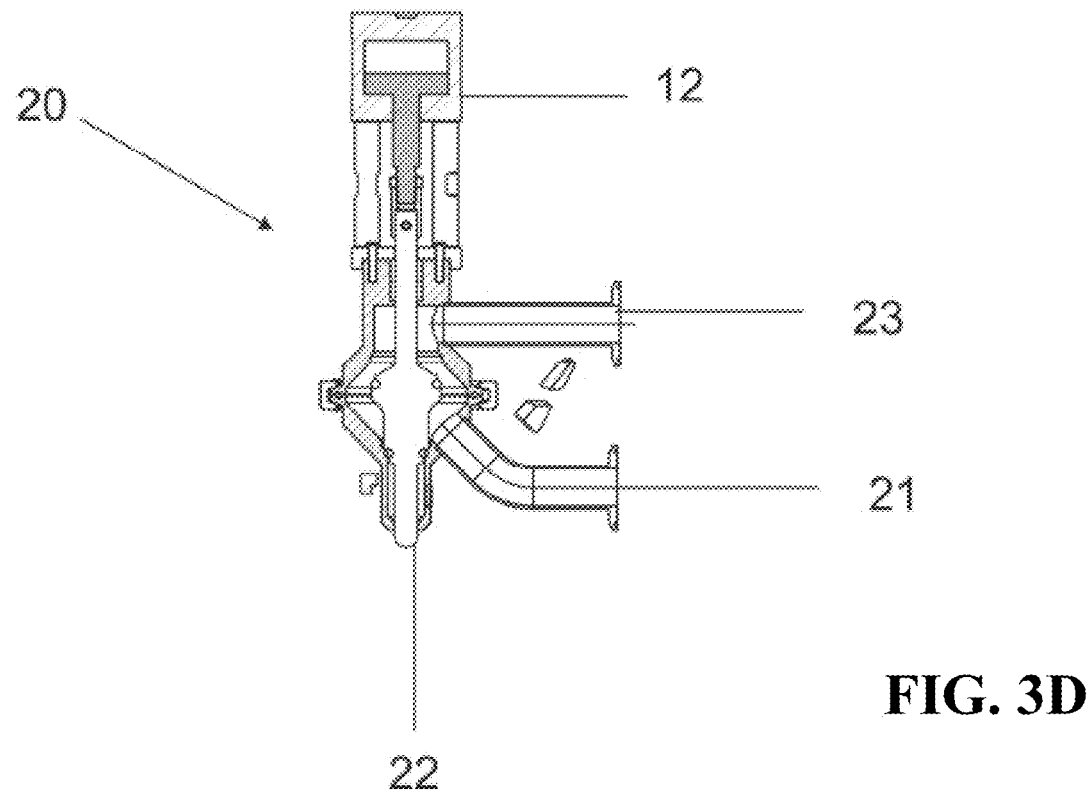

As best detailed in FIGS. 3C and 3D, the dosing valve 20 presents a nozzle 21 that receives the component stored in a tank TAC, by means of a dosing pump Bd, and a dosing nozzle 22 that expels the total flow of product transferred by the dosing pump Bd directly into the tank T, while the pneumatic actuator cylinder 12 is receded, an event called "dosage mode".

When the pneumatic actuator cylinder 12 is advanced, the component received from the tank TAC recirculates in the dosing valve 20 and returns to the supply tank TAC through the output nozzle 23, an event called "recirculation mode".

An image acquisition unit IM arranged above the arms 10 of the volumetric dosing module VDM continuously records the activation of the arms 10 from the command received from the control center CCU and, through digital image processing, performs confirmations of positioning and interlocking of the dosing arms 10 and the opening and closing of the dosing valves 20, as shown in FIG. 3A.

Figure 4A:
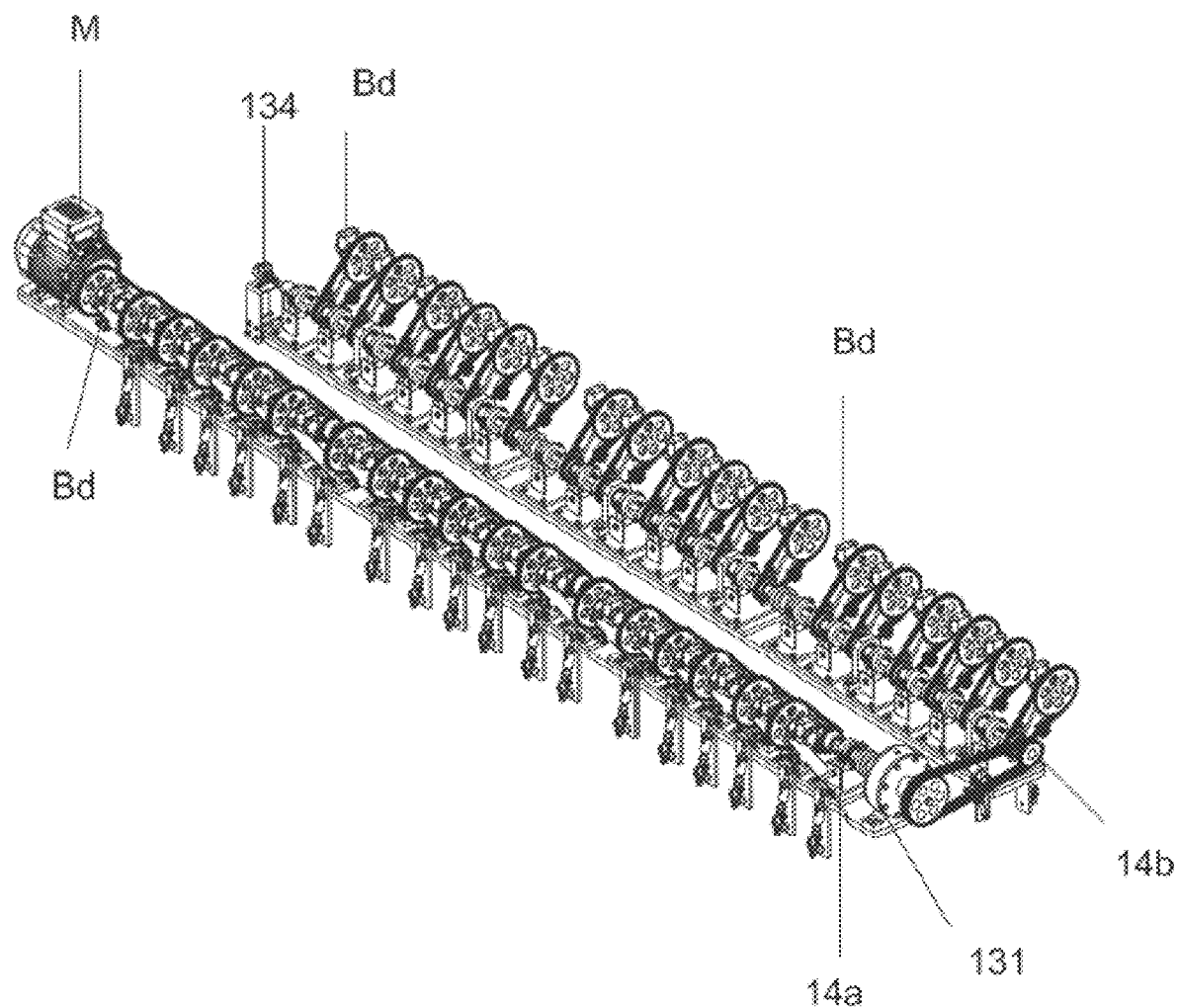
FIG. 4A presents the perspective view of the mechanism of activation of the set of dosing pumps Bd that feed the volumetric dosing module VDM.
Figure 4B:
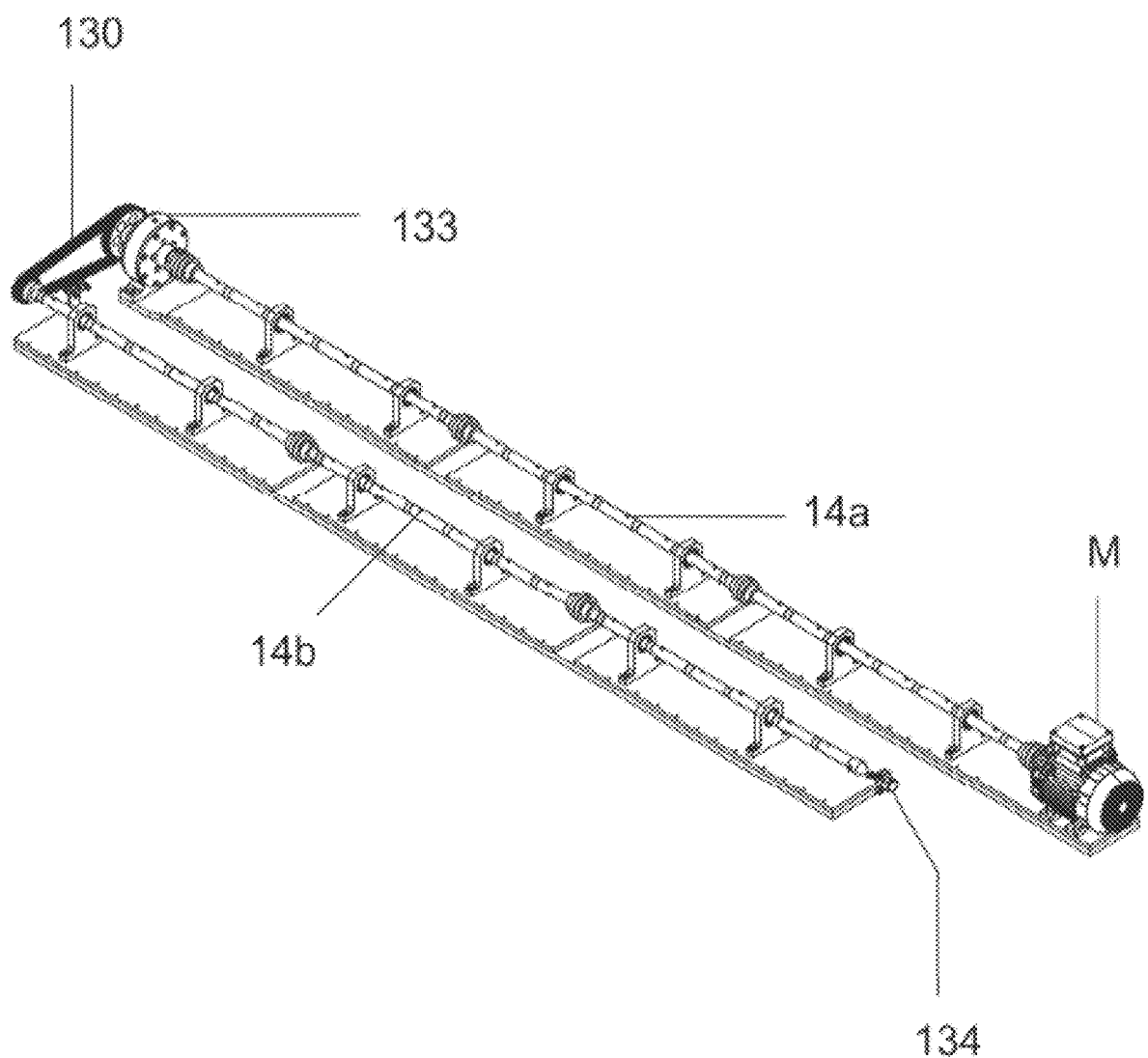
FIG. 4B presents in perspective the system of shared shafts driven by a single motor M.

As shown in FIGS. 4A and 4B, the dosing pumps Bd that feed the volumetric dosing module VDM are installed on two shared central shafts 14a and 14b driven by a single electric motor M and rotating at the same speed, the second shaft 14b being coupled and synchronized to the first shaft 14a through a planetary type reducer 131 and set of sprockets and roller chains that, in addition to transmitting traction from the first shaft 14a to the second shaft 14b, reverses its direction of rotation, leaving the second shaft 14b compatible to the direction of rotation of the set of dosing pumps Bd installed along this second shaft 14b.

Figure 4C:
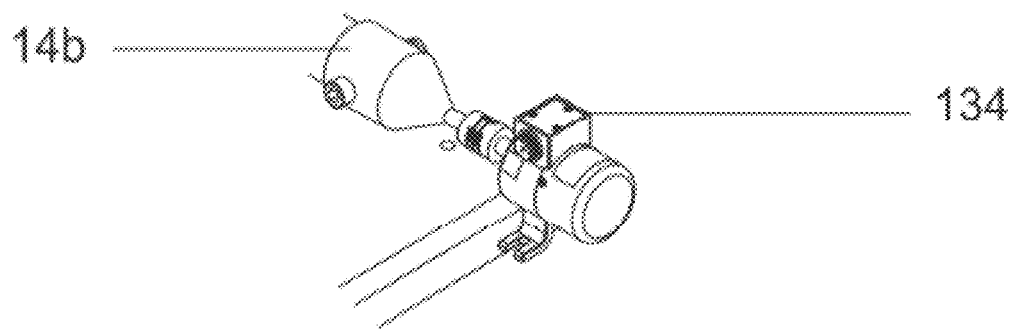
FIG. 4C presents the perspective view showing the digital encoder 134 responsible for measuring the number of rotations performed by the shared shafts to drive the dosing pumps that feed the volumetric dosing module VDM.
Figure 4D:
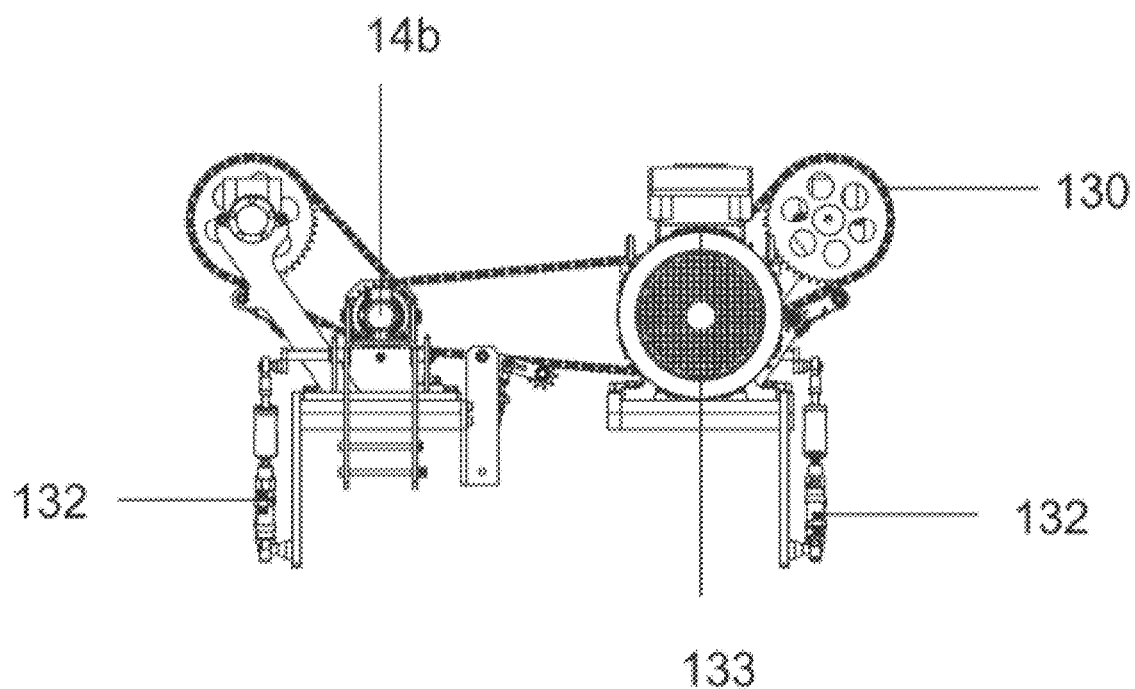
FIG. 4D presents the back view of the force transmission mechanism of the shared shafts for the activation of the dosing pumps Bd and FIG. 4E presents the perspective view of the individual dosing pump drive mechanism.

For each dosing pump Bd a set of pneumatically driven gearing is provided by means of an actuator 132, shown in FIG. 4D, allowing each dosing pump Bd to be connected or disconnected to the respective shared central shaft 14a and 14b by means of a drive mechanism, described below. The force transmission for each dosing pump Bd is made by roller chain and sprockets 130. The two shafts 14a and 14b connect through a transmission box 133 on the opposite side of the electric motor M, at the end of the first shared central shaft 14a. At the end of the shared shaft 14b is arranged a digital encoder 134 that counts the number of revolutions made by the shafts 14a and 14b, relaying this data to the control center CCU, as detailed in FIG. 4C.

Figure 4E:
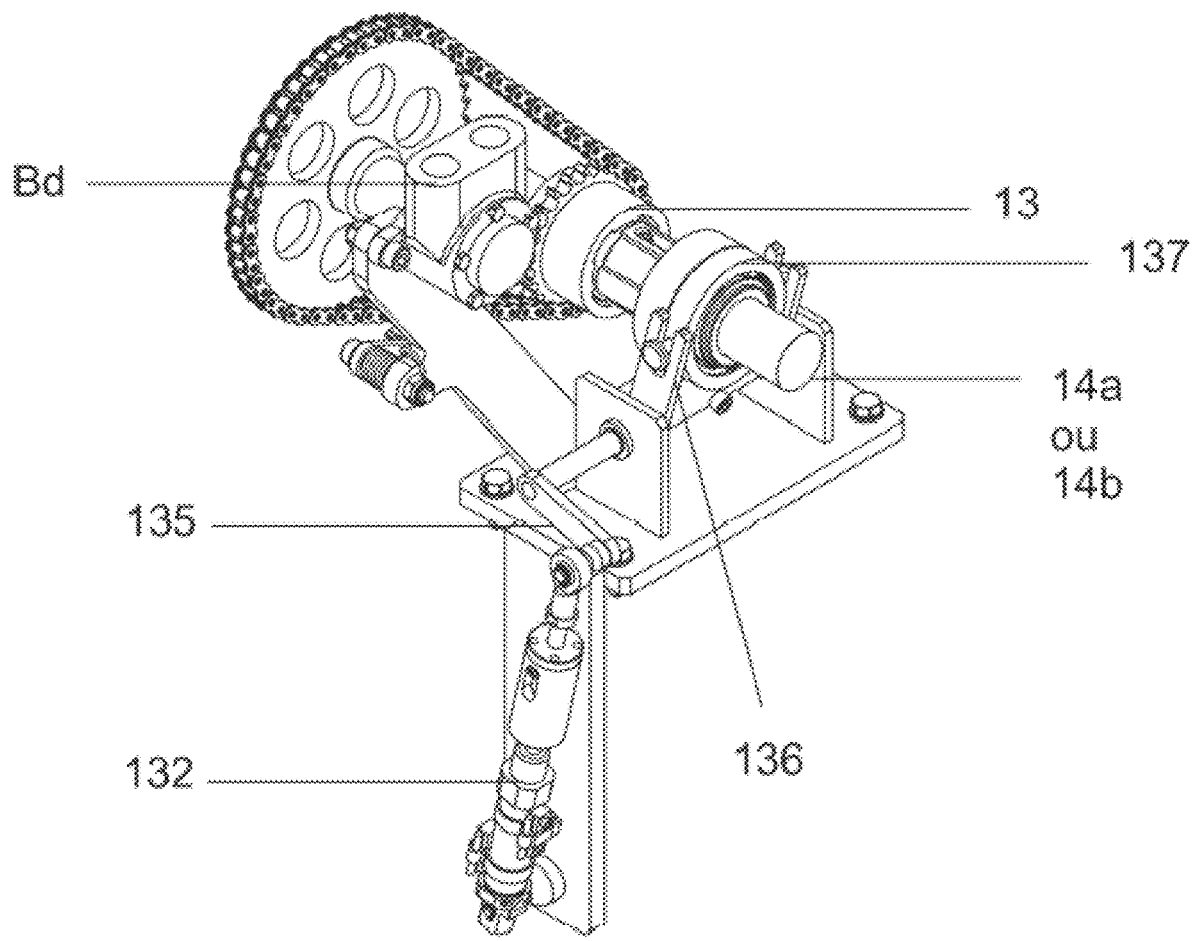

As detailed in FIG. 4E, an individual dosing pump drive mechanism is evidenced that has the function of coupling or not the dosing pump Bd to the shared drive shaft 14a and 14b. For example, if the formulation requires dosing the components corresponding to the $Bd_1$, $Bd_{13}$, $Bd_{21}$ and $Bd_{70}$ dosing pumps, the individual dosing pump drive unit couples only these $Bd_1$, $Bd_{13}$, $Bd_{21}$ and $Bd_{70}$ pumps to the shared shafts 14a or 14b, so that the other dosing pumps Bd are kept still. In this situation, when the pneumatic actuator 132 is activated, the drive arm of the pump's gearing mechanism 135 is moved, which propels the advance fork of the pump's gearing mechanism 136. This fork 136 then pushes the coupling device of the dosing pump 137 forward, so that its "male" type grooved furrows fit into the grooved furrows of the female coupling device 13 of the dosing pump Bd, engaging the two devices 137 and 13. As the coupling device of the dosing pump 137 is solidary to the shared central shaft 14a or 14b, this causes the traction of the shaft 14a or 14b to be finally transferred to the dosing pump Bd, causing it to rotate.

When the pneumatic actuator 132 is receded, there is no gearing of the coupling device of the dosing pump 137 with the coupling device 13, keeping the corresponding dosing pump Bd stopped, due to the non-coupling between the traction shaft 14a or 14b and the dosing pump Bd.

Figure 5:
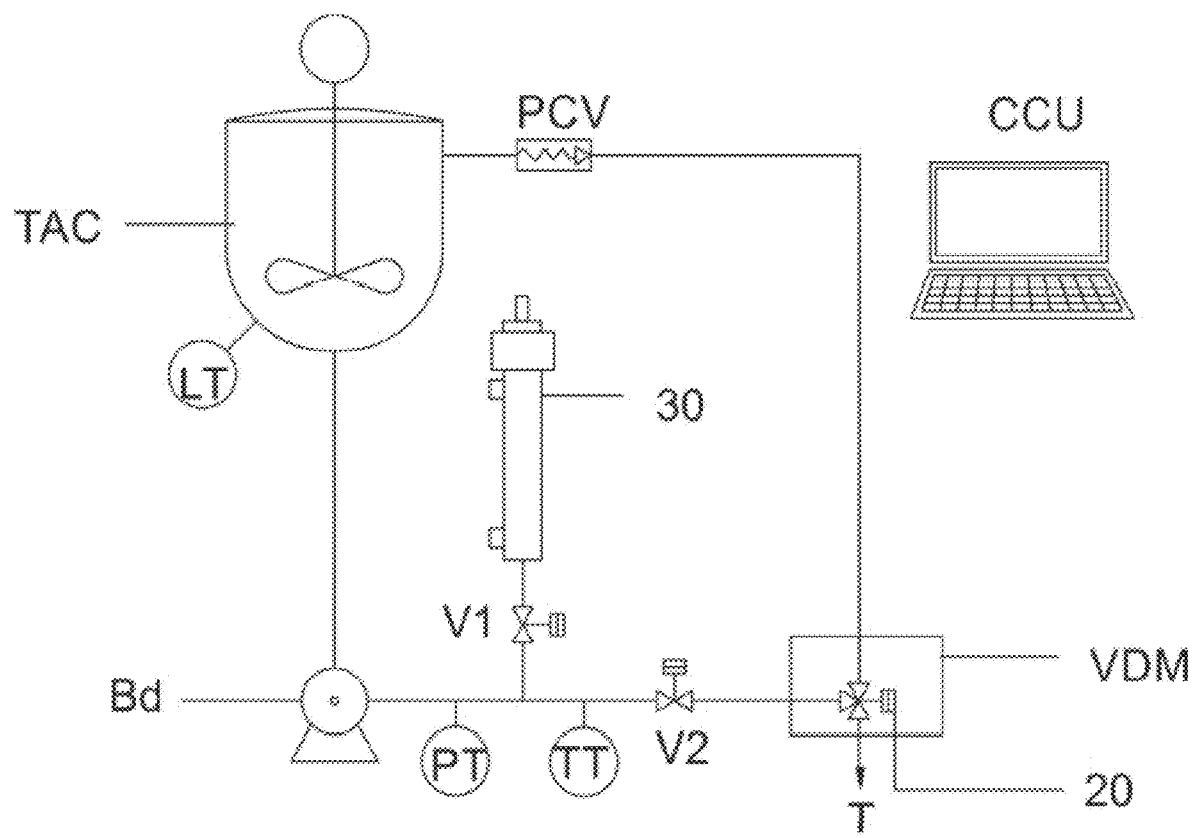
FIG. 5 shows the schematic representation of the set of components for automatic calibration of the dosing pumps Bd.

The calibration of the dosing pumps Bd is done automatically by means of a calibration unit of "volumetric syringe" 30 type, as evidenced in the schematic diagram in FIG. 5.

In addition to the "volumetric calibrator" 30, this diagram contains all components used in the dosing circuit, such as directional valves V1 and V2, component tank TAC, dosing pump Bd, tank level transmitter LT, dosing/recirculation line pressure transmitter PT, product temperature transmitter TT, self-operated pressure regulator valve PCV and dosing valve 20.

Figure 6A:
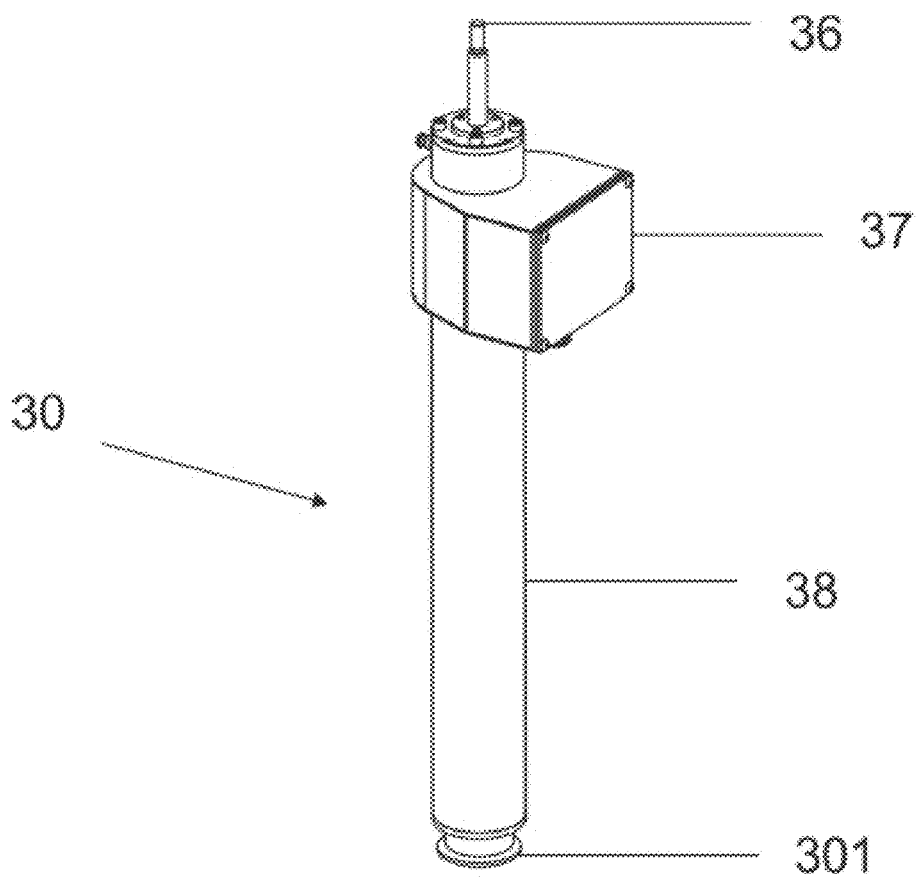
FIG. 6A shows the perspective view of a line volumetric calibrator used for automatic calibration of dosing pumps.
Figure 6B:
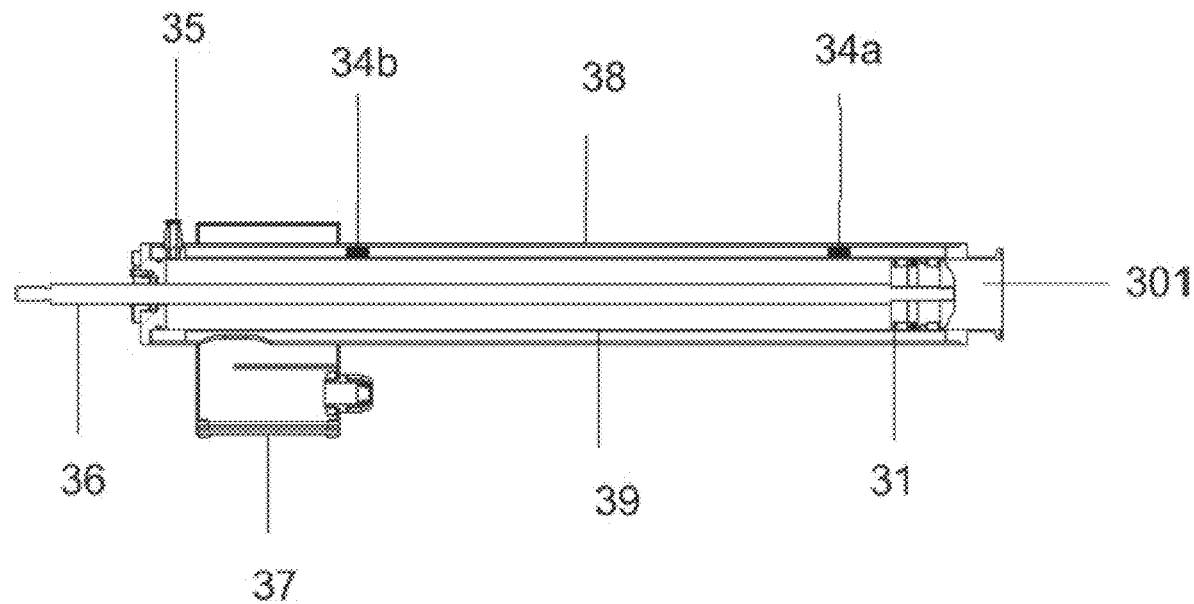
FIG. 6B shows the sectional side view of the volumetric calibrator and FIG. 6C shows the cut detail of the volumetric calibrator plunger.
Figure 6C:
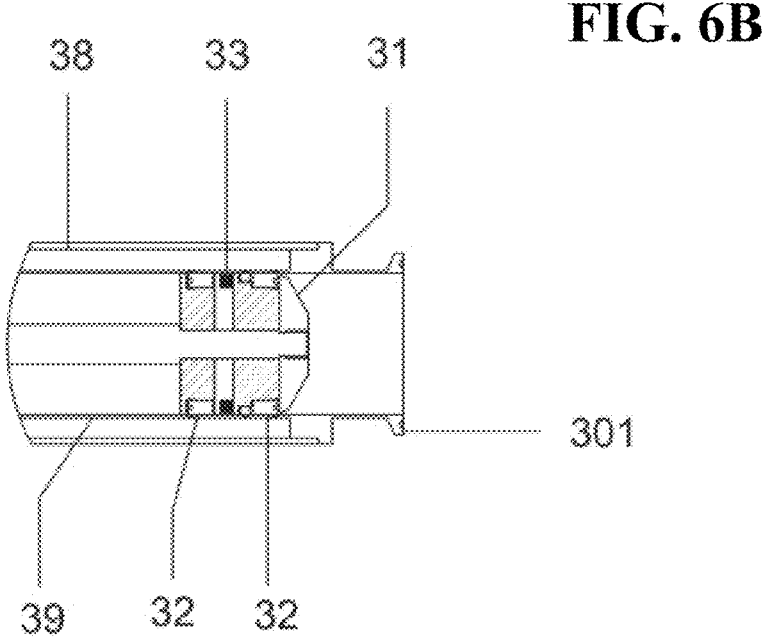
Figure 7:
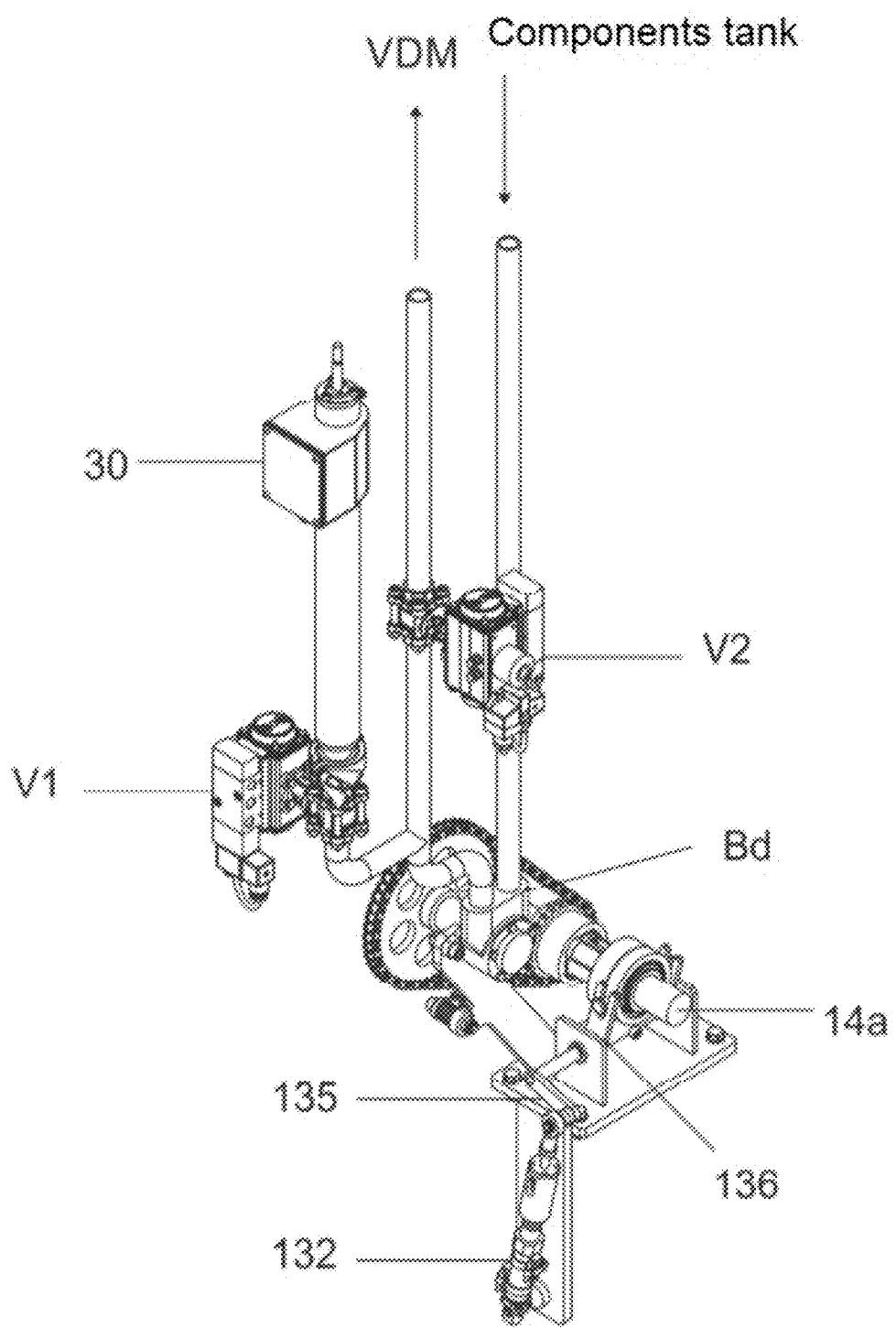
FIG. 7 presents a perspective view of a dosing pump Bd coupled to a shared central shaft 14a and a volumetric calibrator connected to the discharge line of the dosing pump Bd.

This "volumetric syringe" calibration unit 30 externally features a metal tube 38 that protects the inner part of the syringe and the two magnetic position sensors described below. Further, on the outside of the calibration unit 30 a box of electrical connections 37 is arranged and the guide shaft of the plunger 36 can be observed. At the lower end the calibration unit 30 is a nozzle 301 for connection to the discharge line of the dosing pumps Bd. On the inside of the calibrator 30 a non-magnetic metal tube 39 is arranged, acting as the sleeve of the calibrator syringe 30 where the two magnetic position sensors 34a and 34b are fixed. Internally to the syringe sleeve 39 a plunger 31 is arranged, endowed with sealing gaskets 32, between the gaskets 32 a magnet 33 being installed that sensitizes the magnetic position sensors 34a and 34b installed externally and intervaled on the body of the "volumetric syringe" 39, as presented in FIGS. 6B and 6C.

The first magnetic position sensor 34a is positioned near the connecting nozzle 301 of the calibration unit 30 connected to the discharge line of the dosing pumps Bd, and the other magnetic position sensor 34b is installed in the vicinity of the opposite end to the nozzle 301. The calibration unit 30, in the opposite position to the plunger 31, presents a compressed air inlet 35 used to simulate the pressure faced by the dosing pumps Bd during the dosing process, by pressurizing the back part of the plunger 31 in relation to the nozzle 301, increasing the reliability of the calibration.

The calculation of the volume displaced between a magnetic position sensor 34a and the other magnetic position sensor 34b installed on the body of the calibration unit 30 is defined by equation 1.

$$V\text{cal} = \pi R^2 \times L \qquad (1)$$

wherein:
Vcal=calibrator volume 30 in milliliters [ml];
R=internal radius of calibrator syringe sleeve [cm]; and
L=distance between the two magnetic sensors 34a and 34b in [cm].

To perform the calibration of a dosing pump Bd, based on the schematic representation shown in FIG. 5, initially the control center CCU controls the valve opening V1 and the valve lock V2. With the confirmation of the positioning of these valves V1 and V2, the dosing pump Bd, in the calibration process, is activated at a certain standard rotation, its speed and the number of rotations being monitored through the control center CCU. Immediately, the pumped fluid begins to flow into the calibration unit 30 through the mechanical action of the dosing pump Bd, causing the plunger 31 to move backwards. At the exact moment the magnet 33 crosses the first magnetic position sensor 34a, the control center CCU initializes a counter of the number of turns performed by the dosing pump Bd, based on the encoder 134 of monitoring the pump shaft Bd. The displacement of the plunger 31 then reaches the second magnetic sensor 34b, and the dosing pump Bd is then immediately stopped, simultaneously with the number of turns counter monitored by the control center CCU. The valve V2 is then opened and the compressed air pressure applied to the back face of the plunger 31 automatically causes it to automatically advance in the opposite direction, in order to empty the volumetric syringe 30, until the control center CCU, by monitoring the first magnetic sensor 34b, notices again the passage of the magnet 33 by the first sensor 34a, indicating that the volumetric syringe 30 has been emptied. At that time, the valve V1 is then blocked. The control center CCU, in possession of the number of turns that the dosing pump Bd shaft performed in the displacement between the two sensors 34a and 34b, then calculates the volume displaced by rotation, based on equation 2.

$$Vdb = Vcal/N \qquad (2)$$

wherein:
Vdb=volume displaced by rotation [ml/rotation];
Vcal=internal volume of the calibrator 30 [ml]; and
N=number of revolutions performed by the dosing pump Bd during the calibration process With the data obtained in Equation 2, the control center CCU updates the data sheet that relates the individual pumping capacity for each dosing pump Bd of the system.

Figure 8A:
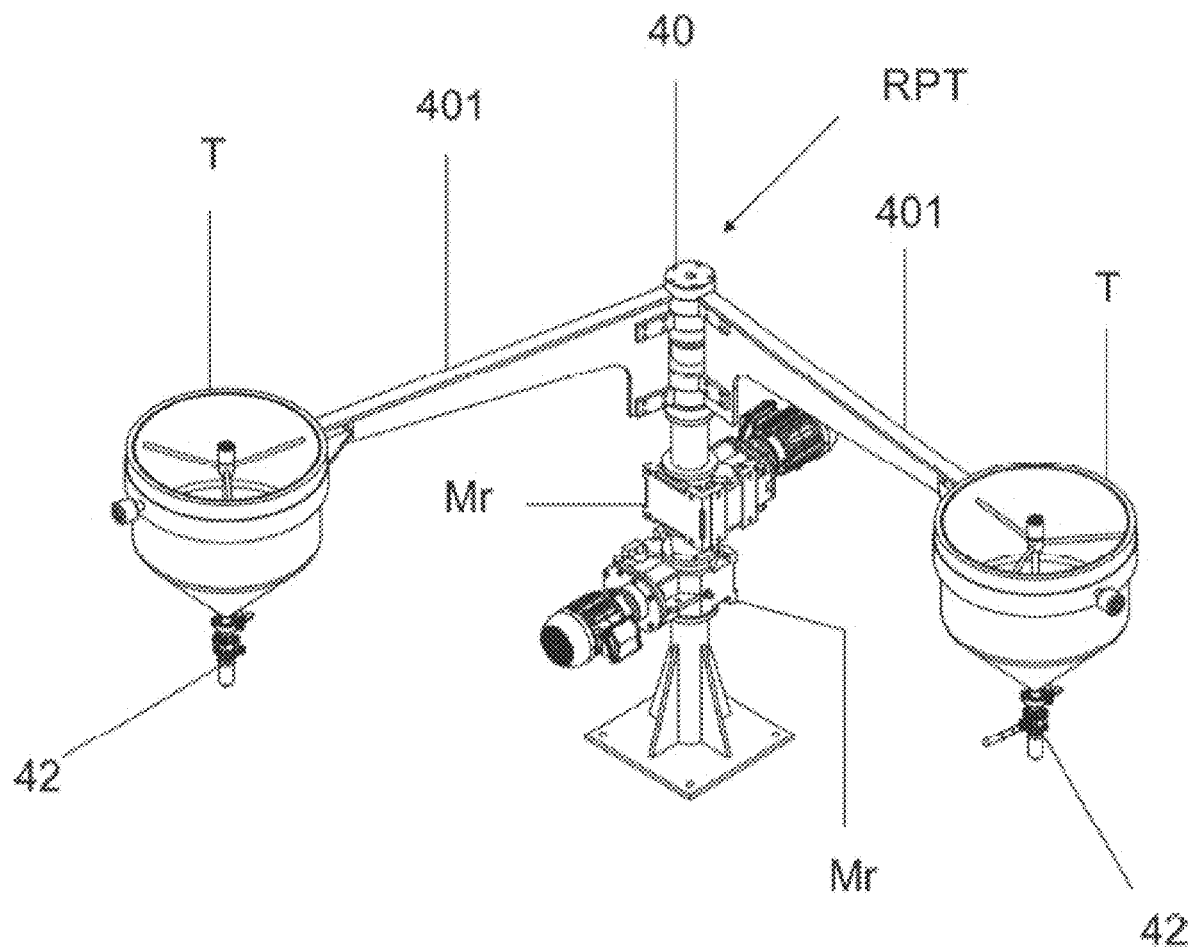
FIG. 8A presents the perspective view of a set of tanks T moved by the rotary mechanism RPT.

In the continuous processing module, as shown in FIG. 8A, a rotary mechanism RPT is provided with an indexing unit activated by the control center CCU which, after activation, revolve around a shaft 40 by means of individual gearmotors Mr. The rotating arms 401 are pulled through the shaft 40 to sequentially position at least one tank T in the mixing stations MS, continuous property adjustment CAS, cleaning CS and the volumetric dosing module VDM, where the dosed components are released into the tank T, in accordance with the formulation previously registered at the control center CCU.

The rotary mechanism RPT has a central shaft 40 to which radial arms 401 rotated by gearmotors Mr are coupled, at whose free end of the radial arms 40 the tank T is positioned, where the dosed components in the volumetric dosing module VDM are released.

Figure 8B:
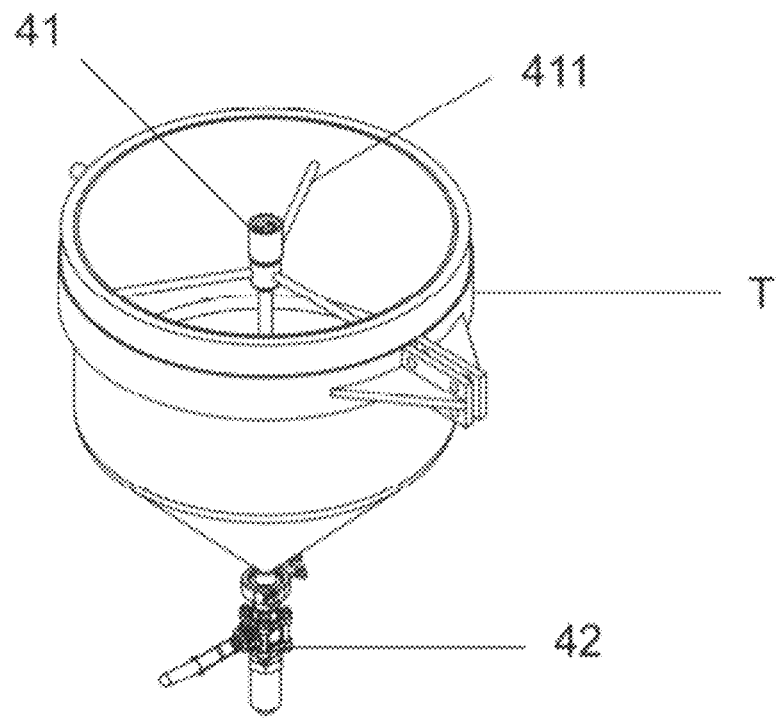
FIG. 8B shows the perspective view of a tank T and FIG. 8C shows the view in section.
Figure 8C:
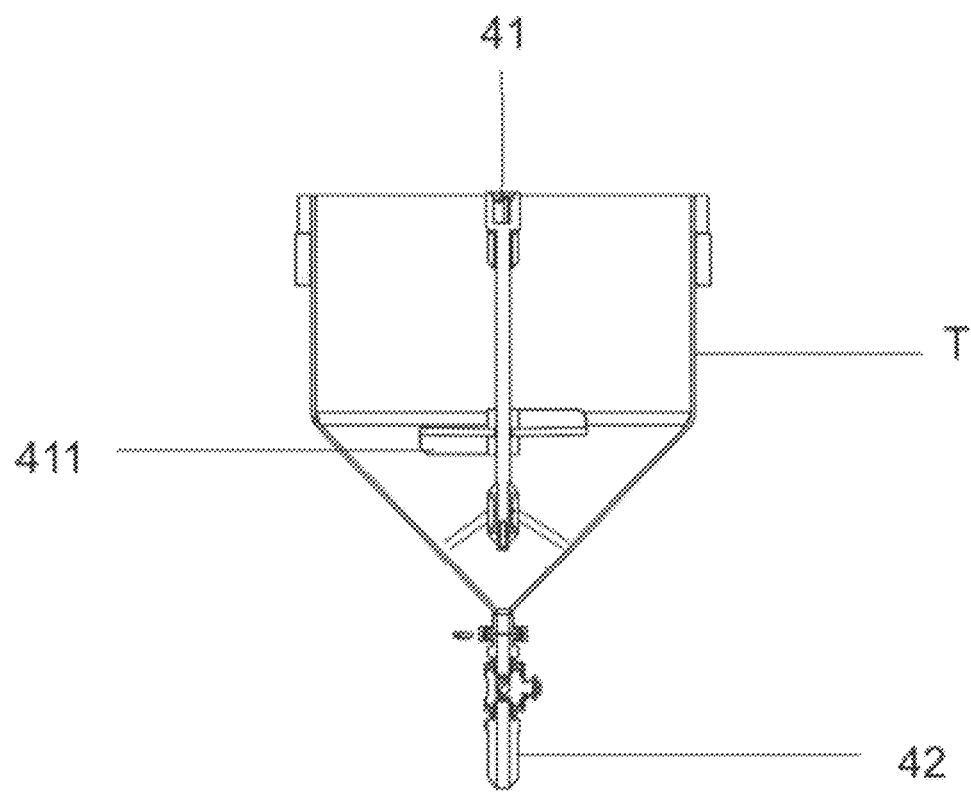

As detailed in FIGS. 8B and 8C, the tank T presents an upper opening where the components dosed and released by the dosing valve 20 are received. In the internal cavity of the tank T an impeller shaft 41 is provided with bearings fixed in the internal structure of the tank T, in the impeller shaft 41 being provided a stirrer 411 of the slanted blades type or similar. At the truncated conical base of the tank T there is a flow valve 42.

The mixing station MS of the continuous processing module promotes prior homogenization of the content of the tank T before the adjustment/packaging step at the continuous adjustment station CAS begins.

Figure 9A:
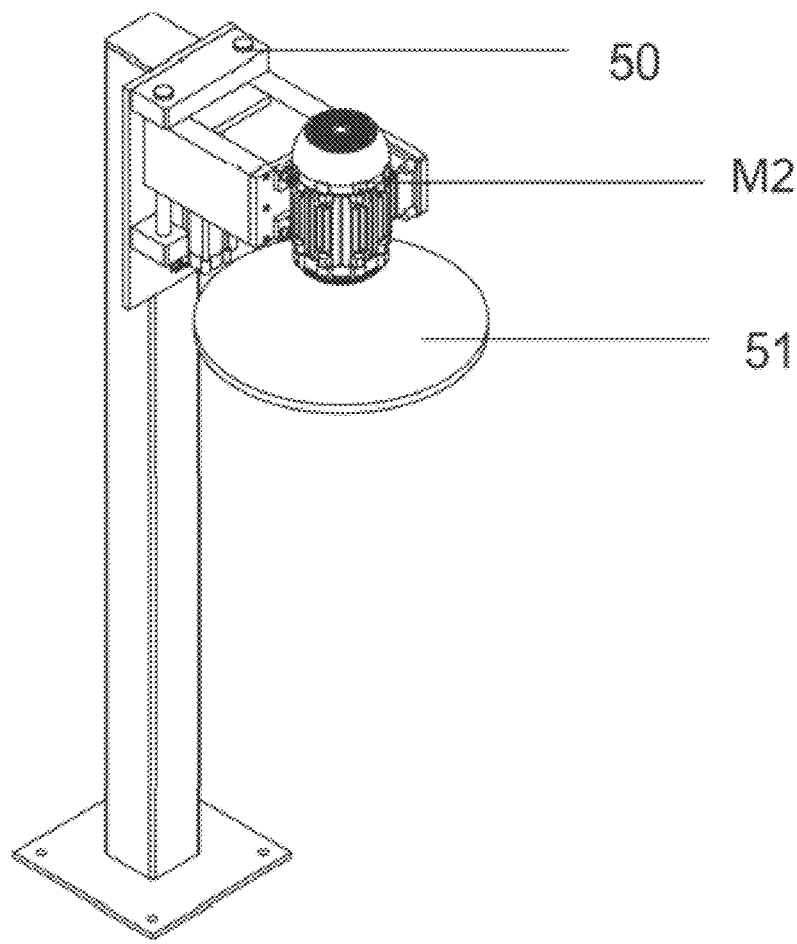
FIG. 9A shows the perspective view of a mixing station MS and FIG. 9B shows the cutaway view of the tank sealing cap 51.
Figure 9B:
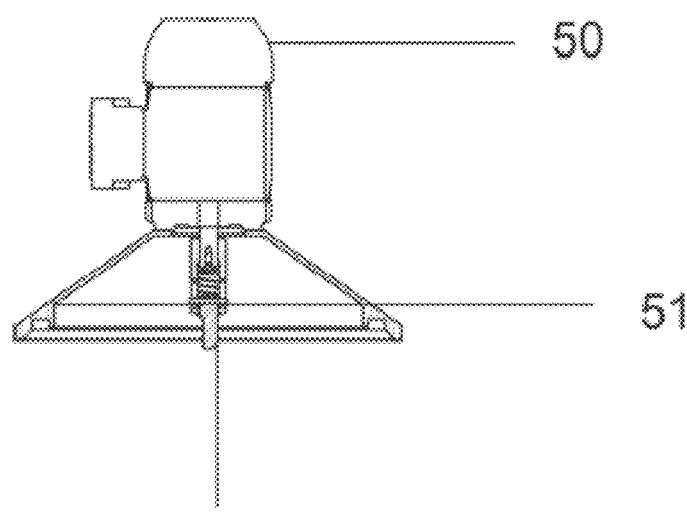

In this mixing station MS, as shown in FIGS. 9A, 9B, a pneumatic lifting mechanism 50 is disposed with a motor M2 and a sealing cap 51 for positioning in the upper part of the tank T, in order to avoid splashing and evaporation of material during the mixing phase.

At the time the tank T is positioned below the motor M2, by means of rotary mechanism RPT movement, the pneumatic lifting mechanism 50 automatically lowers the sealing cap 51 and attaches it to the upper opening of the tank T. A traction pin 52 fixed to the shaft of the electric motor M2 connects the electric motor M2 to the homogenization impeller shaft 41 to promote the mixing of the tank content T through the stirrer 411, as shown in FIG. 9B.

After the homogenization step, the tank T previously loaded into the volumetric dosing module VDM and pre-homogenized in the mixing station MS is rotated by the rotary mechanism RPT to the continuous adjustment station CAS which has the function of performing the on-line analyses and correction of the properties of the paint batches.

The continuous adjustment station CAS, as shown in the mixing station MS and represented in FIGS. 9A and 9B, features a pneumatic lifting mechanism 50 with a motor M2 and a sealing cap 51 for positioning in the upper part of the tank T.

At the time the tank T is positioned below the motor M2, by means of rotary mechanism RPT movement, the pneumatic lifting mechanism 50 automatically lowers the sealing cap 51 and attaches it to the upper opening of the tank T. A traction pin 52 fixed to the electric motor shaft M2 connects the electric motor M2 to the homogenization impeller shaft 41. Simultaneously, in the drain valve 42 of the tank T a circulation pump of material in adjustment mb1 is connected through an automatic coupling device 421. Then, the tank stirrer motor T is simultaneously actuated to the circulation pump of material in adjustment mb1 until the circulation flow established at the control center CCU is achieved. Once the flow rate is achieved, the control center CCU initiates the collection of analysis data through the multi-property meter 80 and the color measurement module on a wet basis 100. Based on the data obtained, and based on the flow of material adjusted by the motor pump mb1, the control center CCU identifies and calculates the individual amount of adjustment of each component required to be dosed continuously in the continuous line mixer 60, which must integrate the correction, which will be translated into different rotations of each dosing pump of the adjustment component Bda. With this information, the control center CCU adjusts the rotations of the dosing pumps Bda of the adjustment components, simultaneously triggering the alignment of a three-way valve vt to the continuous mixer 60. At this very moment, the flow current of material in adjustment and passing through the continuous line mixer 60, coming from the motor pump mb1, begins to receive the currents of contributions of the adjustment components coming from the valves vt inside the mixing chamber 601 in continuous regime, and through the injector valves 61, this composition being vigorously mixed through the homogenization impeller 17 of the continuous mixer 60.

Figure 10A:
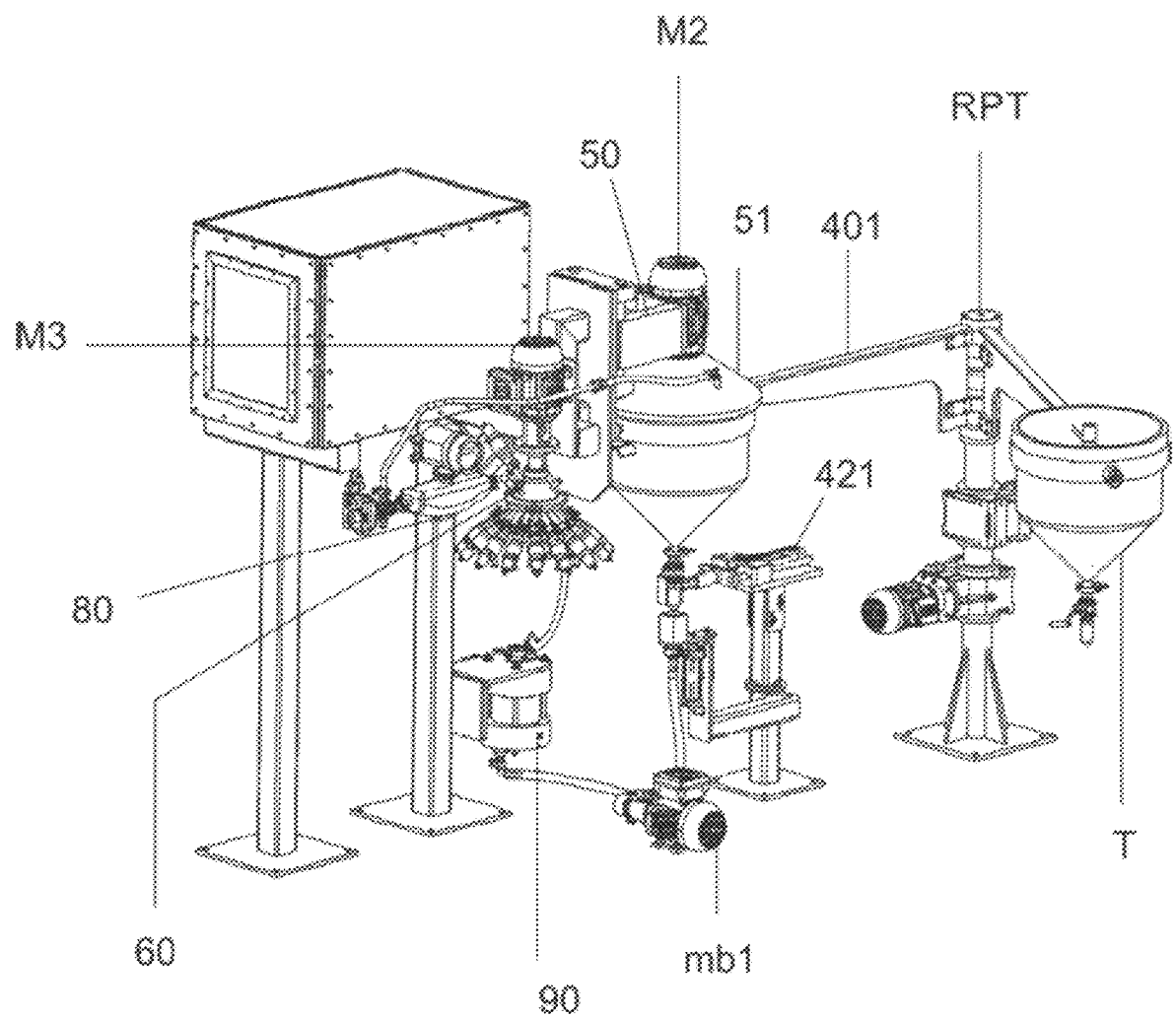
FIG. 10A shows the front perspective view of the continuous adjustment station CAS.

As shown in FIG. 10A, for data collection by the control center CCU, in the continuous adjustment station CAS a circuit containing a continuous line mixer 60, a multi-property meter (mass flow, temperature, viscosity and density) is provided with Coriolis effect operating principle 80, a measurement unit and color adjustment in wet pathway 100, a three-way valve for targeting material in alignment or return to the process cycling tank or for targeting the filling machine when the product has reached specifications; and a homogenization unit into the tank T.

Figure 10B:
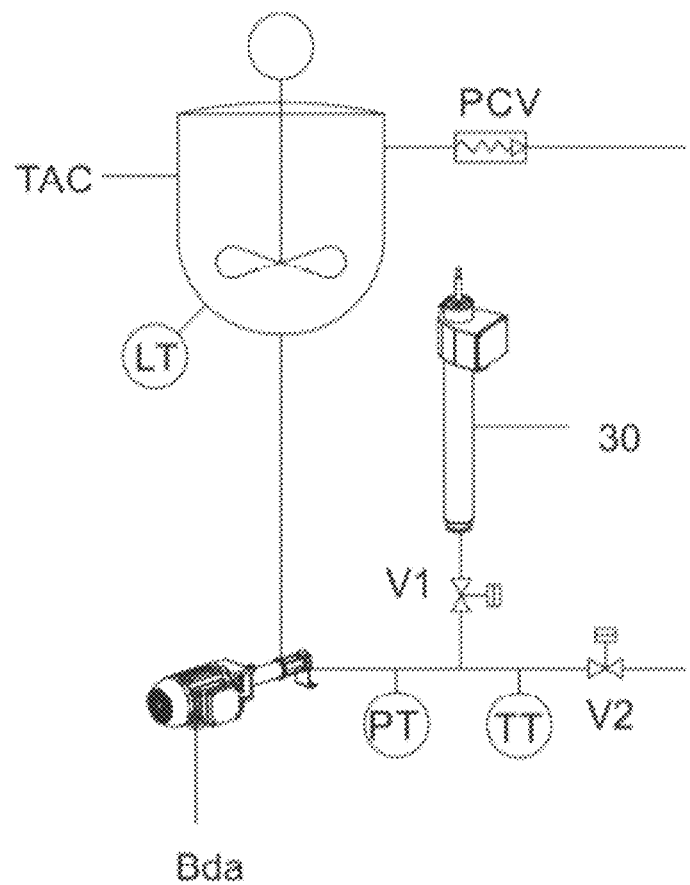
FIG. 10B presents a schematic representation showing the connection of a circuit of one of the adjustment components with the mixer 60, responsible for promoting continuous mixing to the product current from the tank T with the currents of adjustment materials from similar circuits shown in FIG. 10B.

As shown in FIGS. 10A and 10B, in the continuous adjustment station CAS a continuous line mixer 60 is installed for adjusting the properties of the paints in production, the continuous line mixer 60 providing a continuous flow of the component for adjusting the properties of the paint batch in process, simultaneously performing the rapid and efficient mixing of the component with the product flow in adjustment where, by means of booster motor pumps mb1, boost the contents of the tanks T to the continuous adjustment station CAS.

Figure 10C:
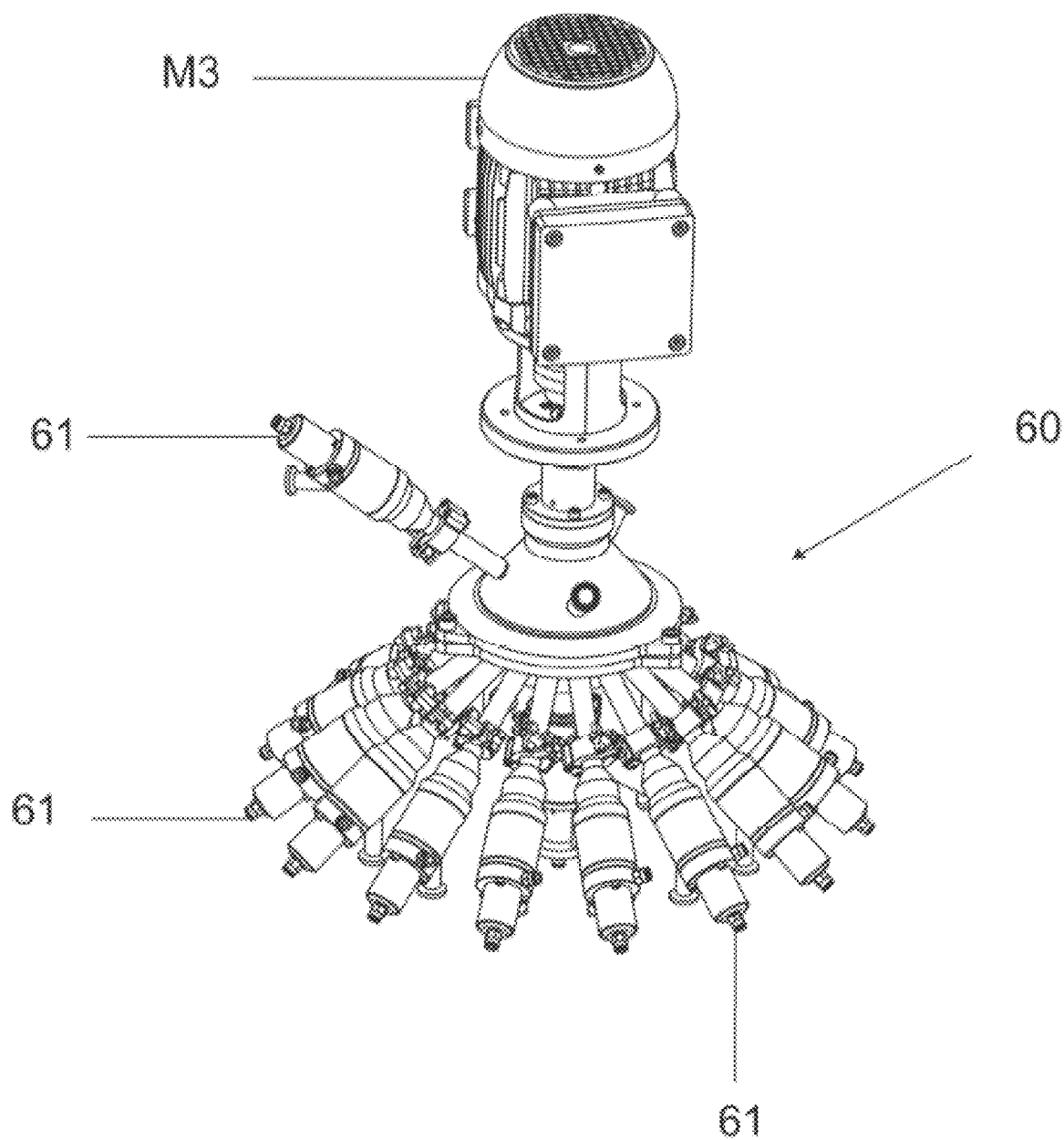
FIG. 10C presents the perspective view of the mixer 60.
Figure 10D:
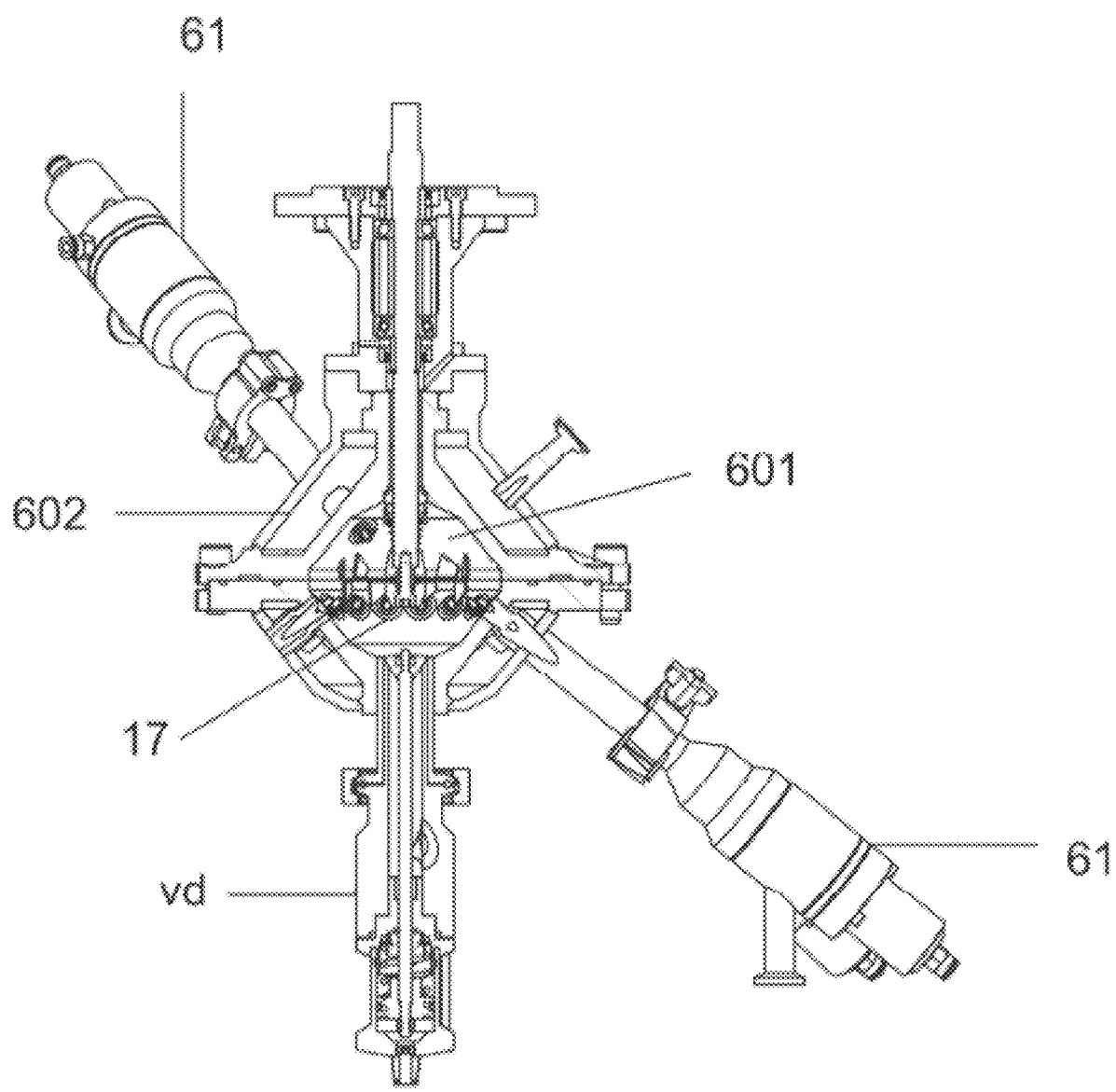
FIG. 10D shows the cutaway view of the mixer.
Figure 10E:
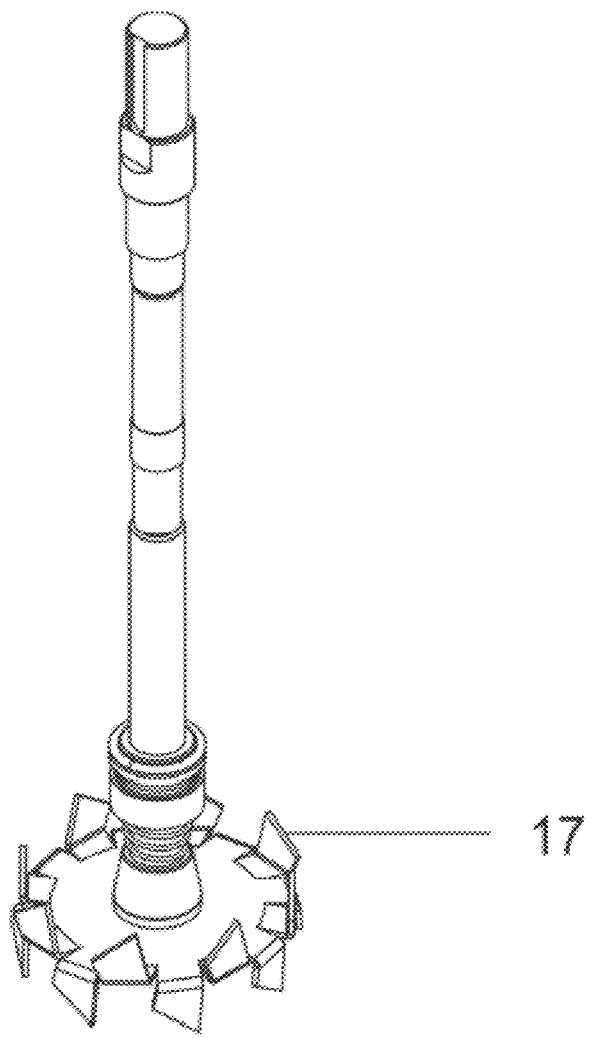
FIG. 10E presents the detail of the mixing impeller assembly of the mixer 60.

The continuous line mixer 60, driven by an electric motor M3, as shown in FIGS. 10C and 10D, features a body endowed with a mixing chamber 601 with low dead volume and reduced response time, endowed with a homogenization impeller 17, and an external sleeve 602 for integral cooling of the mixing chamber 601, the mixer 60 that provides a mixer 60 that provides, through radial injection valves 61 installed in the mixing chamber 601, a continuous flow of components for adjusting the properties of the paint batch in process, simultaneously, quickly and efficiently mixing these currents of materials supplied by the color dosing pumps Bda that feed the continuous adjustment station CAS with color adjustment dyes, as shown in FIGS. 10A and 10B, with the product flow in adjustment, coming from the tank T and boosted to the inside of the mixer through the booster motor pump mb1.

At the base of the mixing chamber 601 a pneumatically actuated drain valve is provided, used during the cleaning and decontamination process of the internal cavities of the mixer 60.

The continuous line mixer 60 operates jointly with a multi-property meter (viscosity/density/mass flow), with Coriolis technology 80 and a color analyzer module in wet base 100 that measure these properties and direct the measurement data to the control center CCU, where a computer program performs adjustment calculations for the achievement of product specifications. The adjustments are translated into variations of continuous flows of components that are inserted inside the mixing chamber 601 of the continuous line mixer 60 through injector valves 61.

Figure 10F:
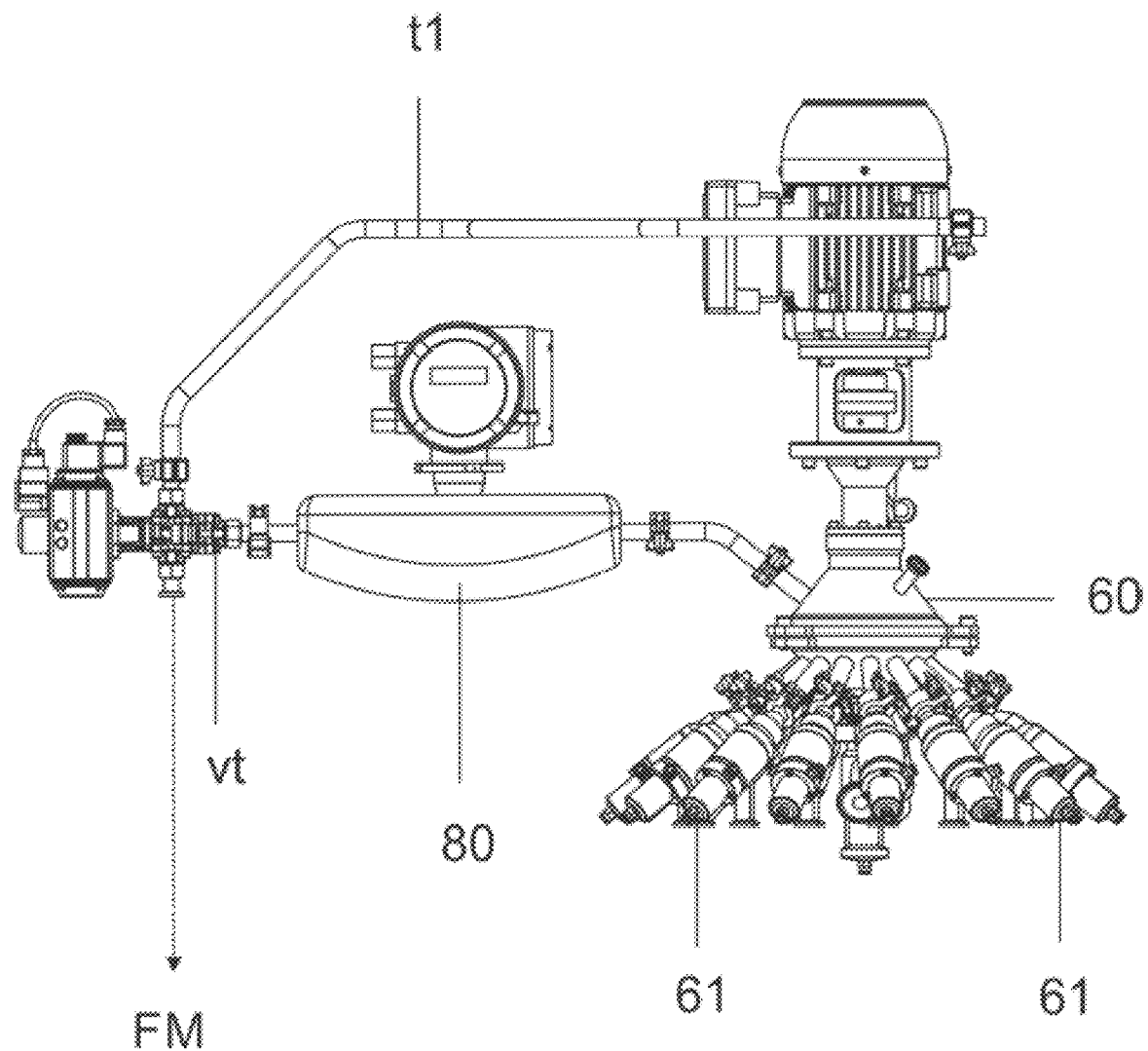
FIG. 10F presents a perspective view of the mixer 60 integrated into the multi-property meter 80 for measuring viscosity, density, mass flow temperature and volumetric flow properties.

A three-way valve vt is installed subsequent to the multi-property meter 80, directing the material that is not yet compliant to return to the tank T, through the pipe μl, maintaining this condition until the product meets the final specifications defined at the control center CCU, when the three-way valve vt directs the product to the filling station FM, as shown in FIG. 10F.

Figure 10G:
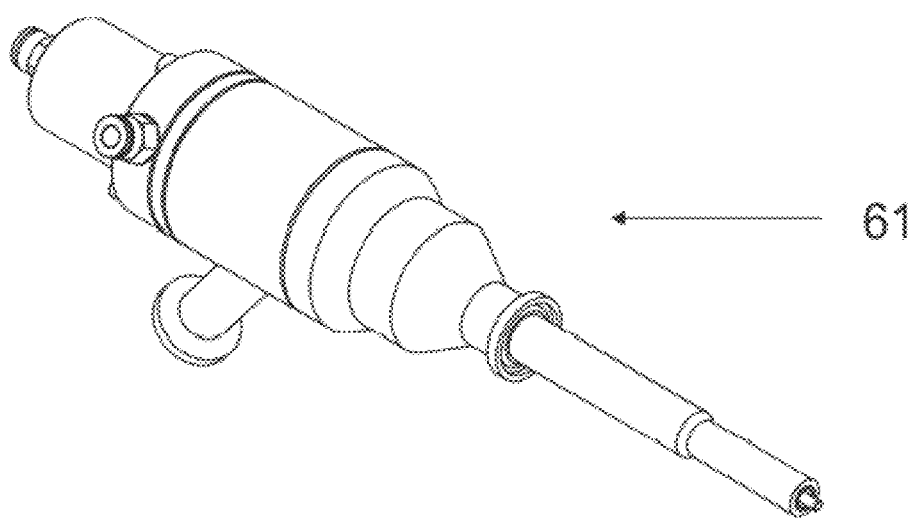
FIG. 10G shows the perspective view of the dosing valve 61 and FIG. 10H shows the cutaway view of the dosing valve inserting the components inside the mixing chamber 601 of the continuous line mixer 60 after the adjustment calculations performed at the control center CCU from the measurement performed by the multi-property meter 80 and the color measurement module on a net basis 100 and other potential measurements pH, conductivity, dyeing force, cover, among others.
Figure 10H:
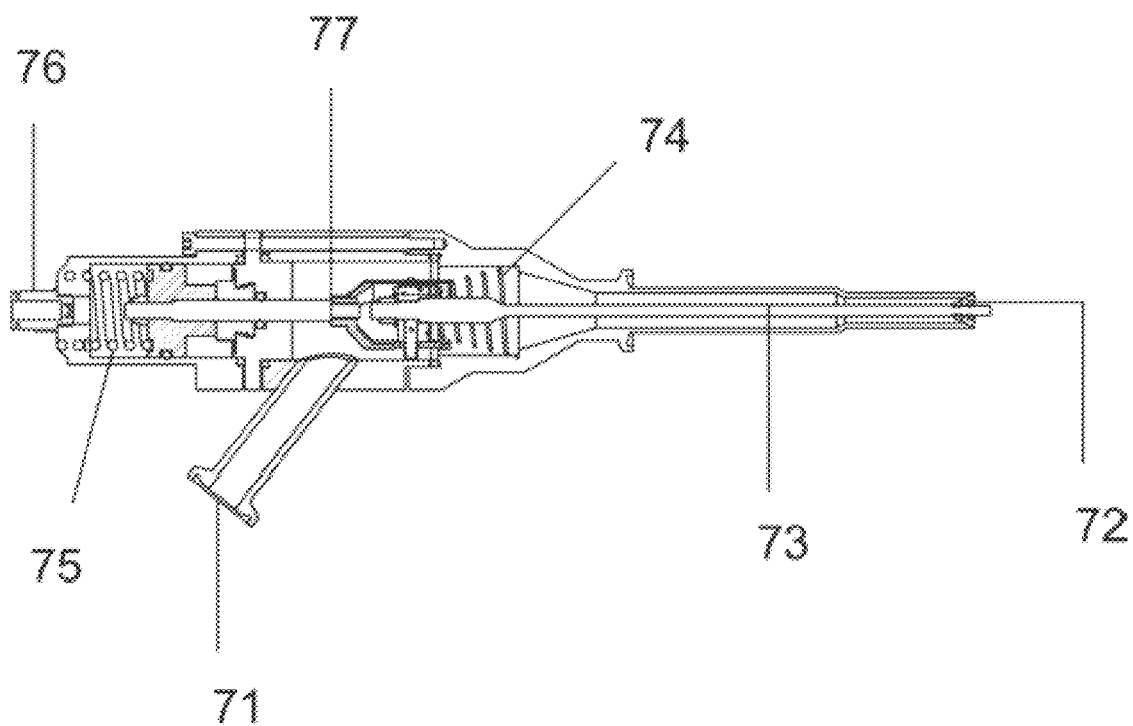

As shown in FIGS. 10G and 1011, the dosing valve 61 receives the component from the dye dosing pump Bda through the nozzle 71, the material that runs through the inside of the valve 61 until it is expelled through the shutter 72 at the other end of the valve 61 connected to the mixing chamber 601 of the continuous line mixer 60. The shutter 72 is attached to the valve shaft 73 which is tensioned by the conical spring 74 in order to seal between the shutter 72 and the valve seat, and the adjustment material to be dosed by the valve 61 must overcome this resistance by the hydraulic pressure produced by the dye dosing pump Bda. At the back of the valve shaft 73 a fork-shaped locking shaft 77 is provided with the function of ensuring the watertightness of the dosing valve 61 when the process is stopped, the locking shaft 77 fixed to a sliding pneumatic mechanism 75 that is activated when intended to release the valve shaft 73 during the dosing process, the pressurization of the pneumatic mechanism chamber 75 being necessary by intake of compressed air in the pneumatic connection 76.

For the conditioning of the temperature of the product in adjustment, coming from the rotary tanks T, a heat exchanger 90 is provided that causes a relatively thin film to travel through a rectangular channel with a single helical profile machined on a cylindrical surface. Thus, the material that flows through this channel, even with high viscosity, performs heat exchange extremely efficiently, especially in view of the facilitation of heat transfer by the conduction mechanism, since in materials of moderate, medium or high viscosity, such as paints and correlates, the heat transfer by convection is greatly impaired by the fluid flow regime, which in this case becomes laminar.

Figure 11A:
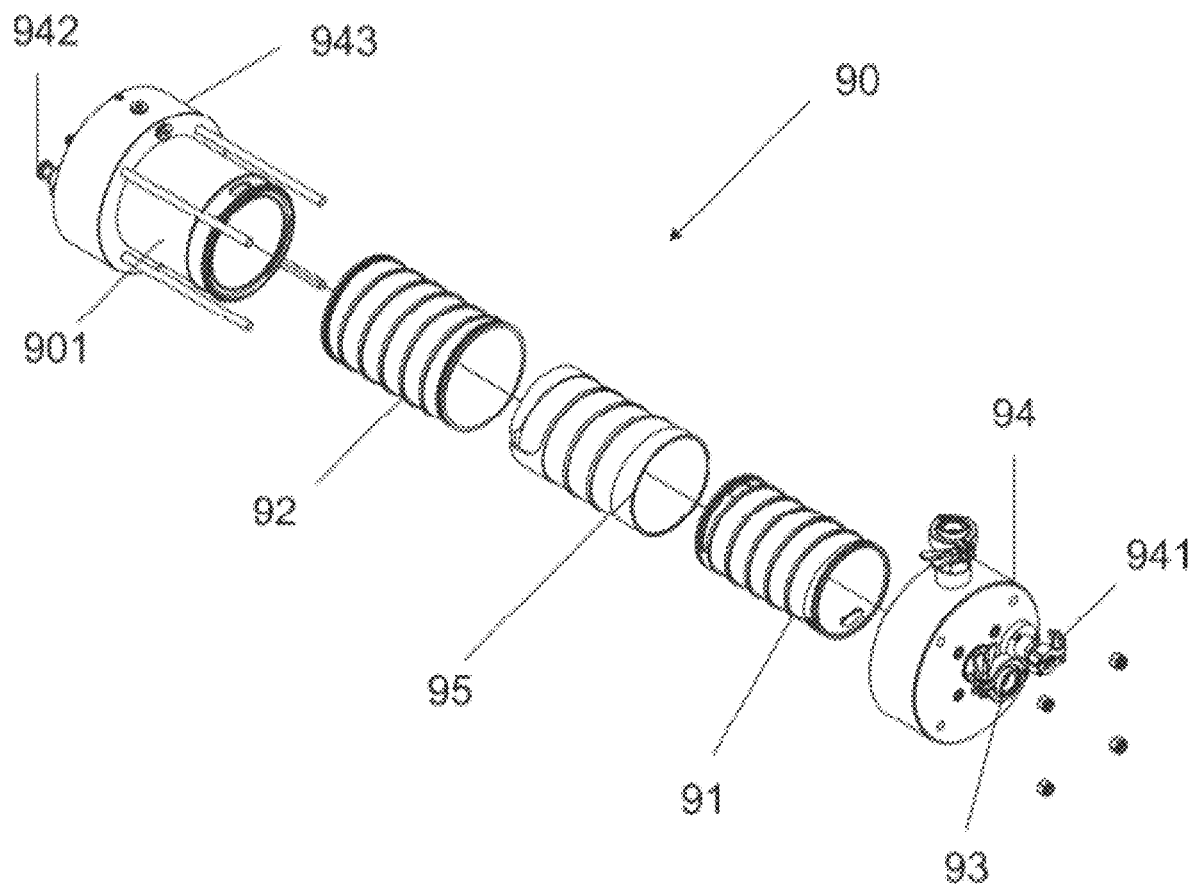
FIG. 11A shows the exploded view of the heat exchanger.
Figure 11B:
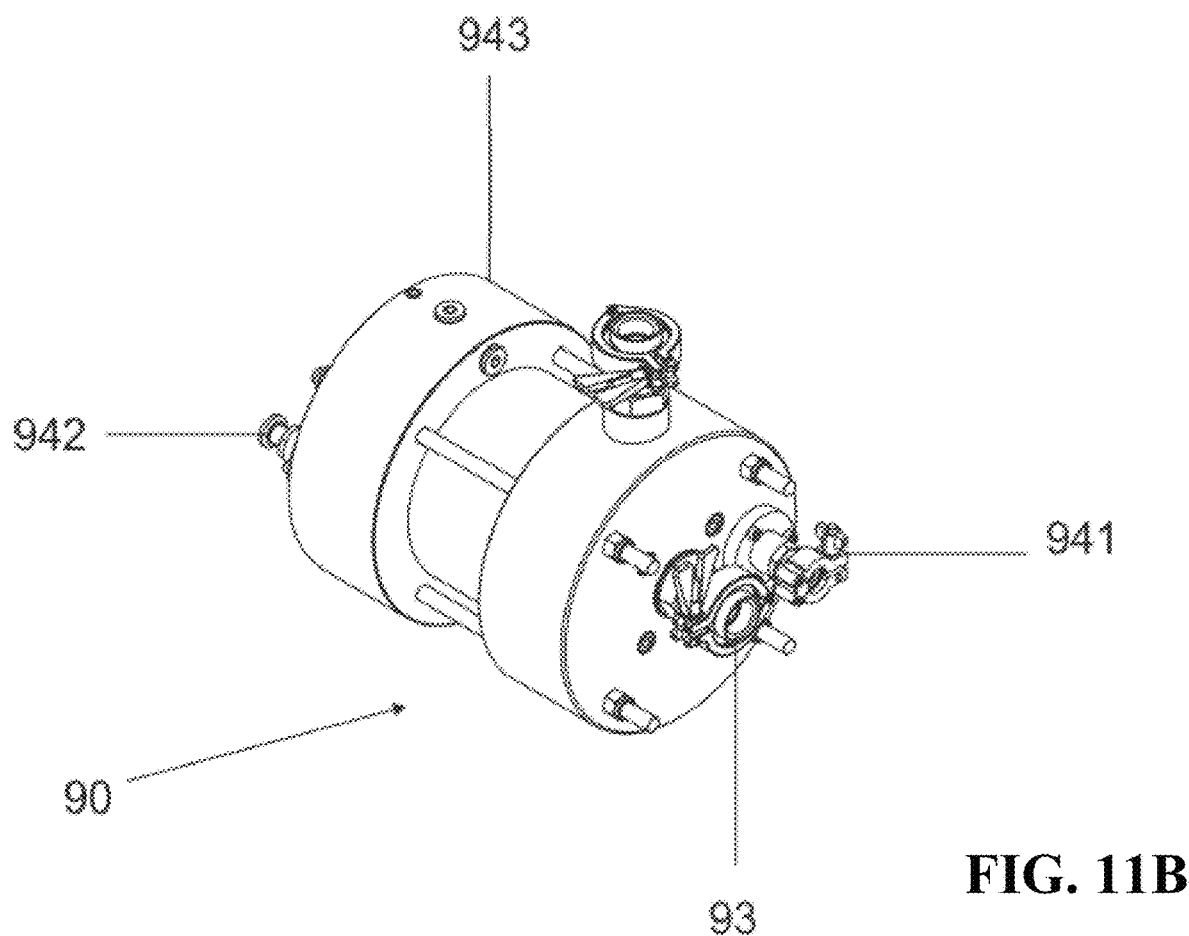
FIG. 11B presents the perspective view of the heat exchanger and FIG. 11C shows the side view in section.
Figure 11C:
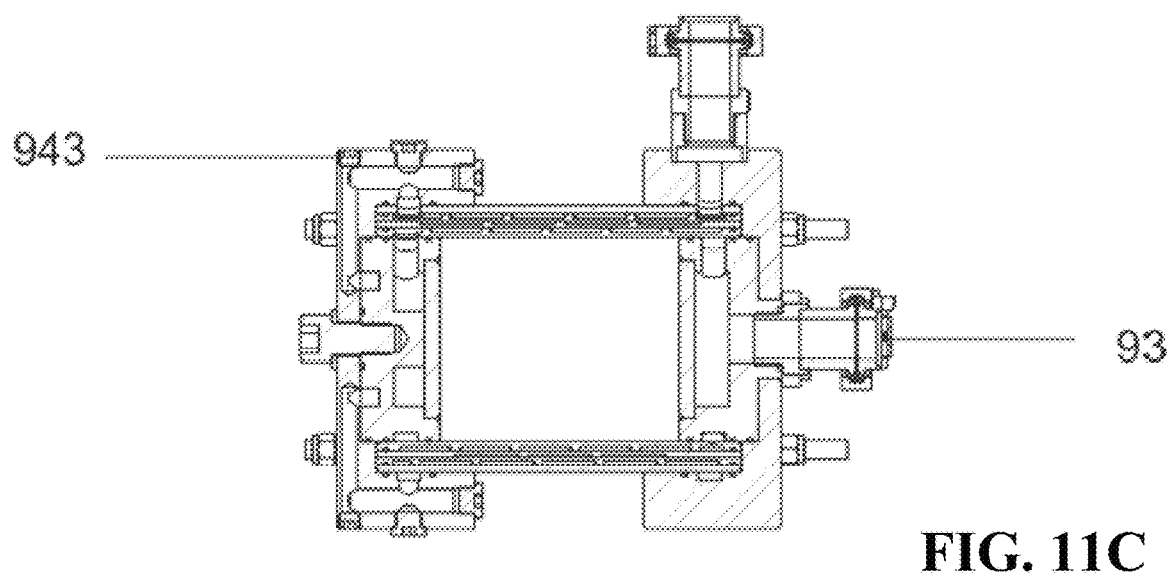

As shown in FIGS. 11A, 11B and 11C, the heat exchanger 90 presents cylindrical surfaces with helical profile channel machined on its surfaces through which the material flows, being surrounded by two other concentric cylinders, one internal cylinder 91 and one external cylinder 92, between the cylinders 91 and 92 circulates a refrigerant taken in through the nozzle 93 installed in the "mirror" of the exchanger 94 and initially running through the helical channel of the inner cylinder 91, until it reaches the mirror of the exchanger 94 where the refrigerant flow is directed to the helical channel of the external cylinder 92, through which the cooling fluid is directed and contained through the external housing of the exchanger 901, thus returning again to the "mirror" of the exchanger 94, and this path is fully sealed in relation to the intermediate cylinder 95 through which the product in temperature adjustment crosses the heat exchanger 90. The temperature adjustment product is taken in by the nozzle 941 of the "mirror" of the exchanger 94 and leaves the exchanger through the nozzle 942 installed in the "mirror" subsequent to the exchanger 943.

Figure 12A:
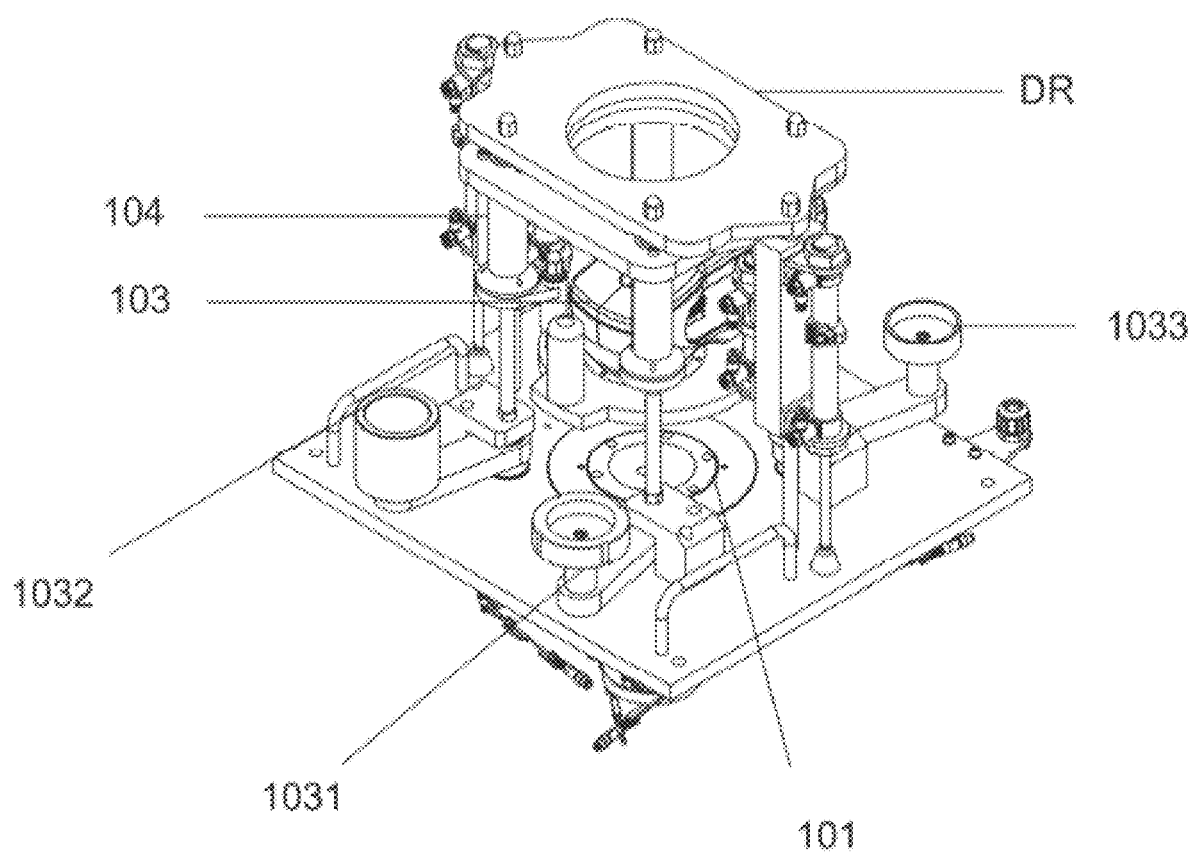
FIG. 12A shows the perspective view of the robotic device for measuring the color of liquid-based paints.

As shown in FIG. 12A, a robotic device DR endowed with a computational control unit for controls and interlocks is connected to the control center CCU by means of digital fiber optic communication, the robotic device DR performing the measurement and color adjustment in an online way, through a color-to-wet measuring cell (in liquid medium) 101, designed for precise measurements of the color variable, in paints and correlates, in its characteristic "in natura" (liquid base), eliminating the need for the time-consuming application and drying processes preceding color measurement, conventionally performed in the state of the art.

Figure 12B:
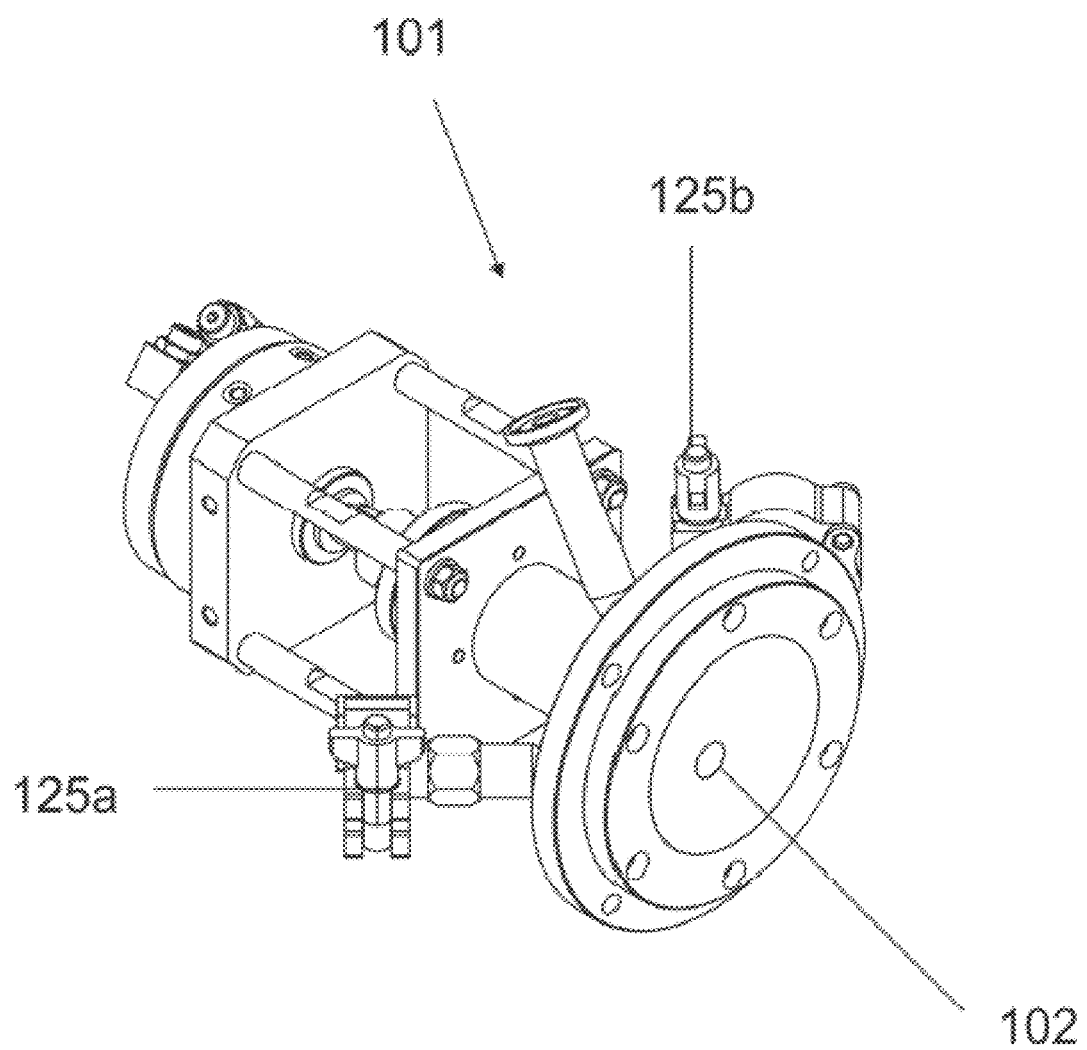
FIG. 12B shows the perspective view of the color-to-wet measuring cell and FIG. 12C shows the cutaway view of the color-to-wet color measurement cell.
Figure 12C:
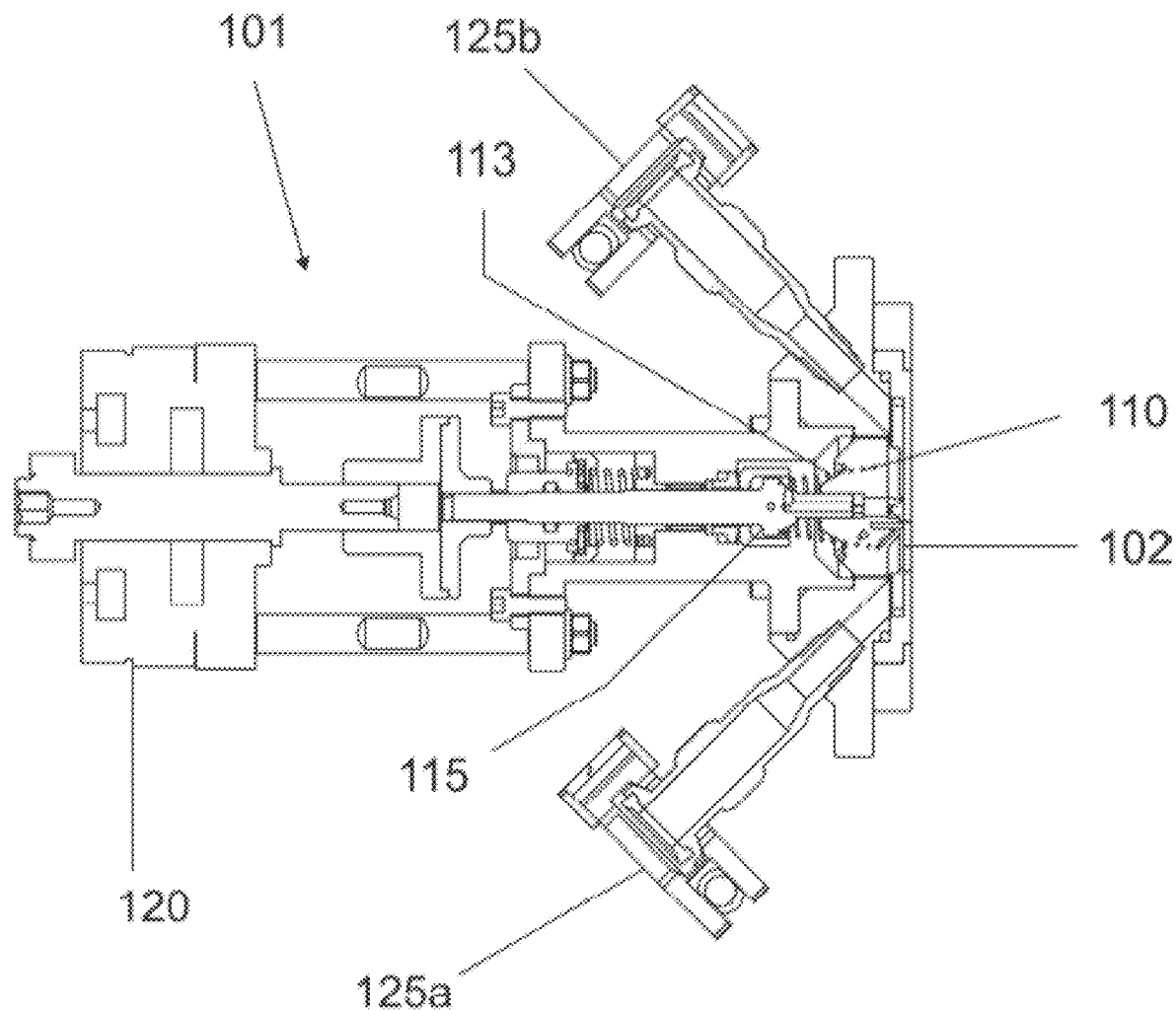

The color-to-wet measurement cell (in liquid medium) 101, as shown in FIGS. 12B and 12C, has airtight containment for the product circulating through it. The flow of material that crosses this cell 101 is admitted in continuous flow through the connecting nozzle 125a and leaves the cell through the nozzle 125b, presenting an optical window in transparent crystal 102, through which, a spectrophotometer 103 coupled from the outside of that cell, makes the readings of the variable color in wet medium, in the visible spectrum region (400 to 700 nm). Every reading and cleaning cycle is commanded by the control center CCU which, based on the parameters measured by the spectrophotometer 103, generates parameters for adjusting the color variable through changes in the dosages of the dosing pumps Bda in the continuous adjustment station CAS, until the entire contents of the tank T are consumed, delivering material within the specifications to the filling equipment.

Figure 13:
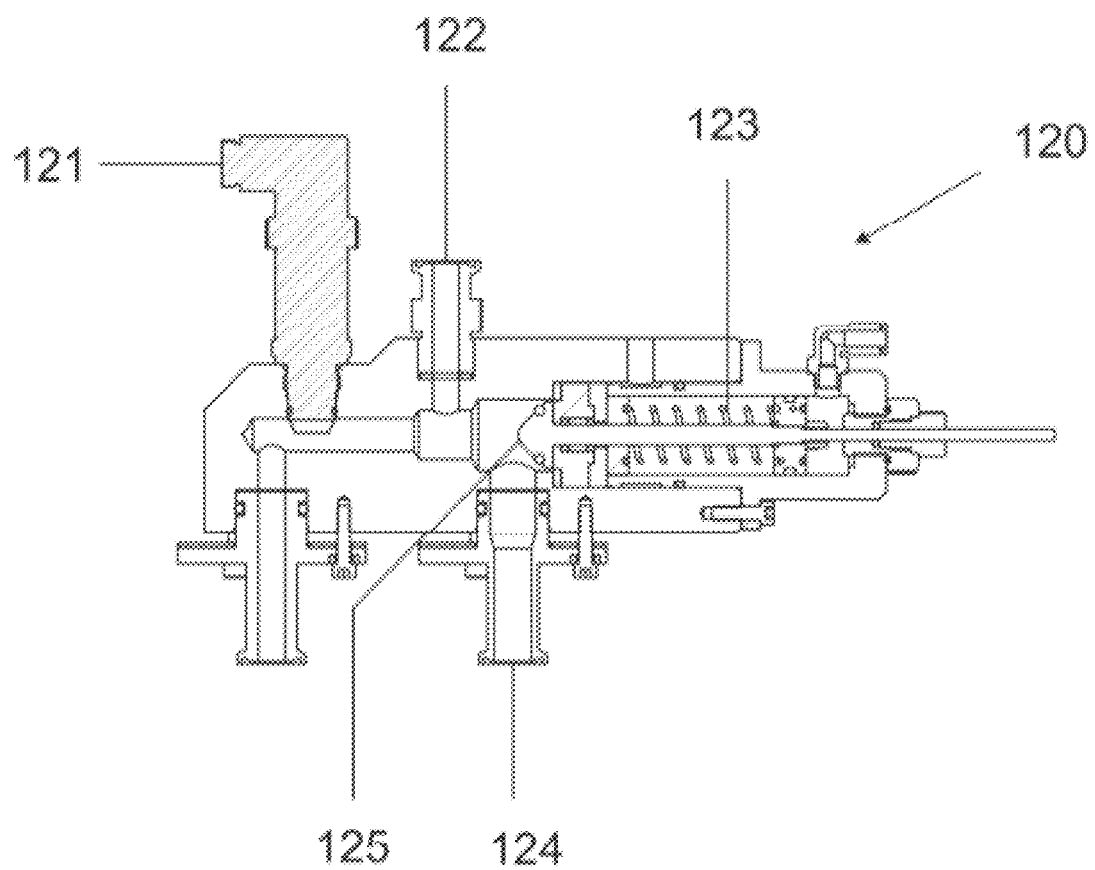
FIG. 13 shows the side-cutaway view of the protection device against overpressure of the wet color measuring cell.

The color-to-wet measuring cell in liquid medium 101 can operate up to 5 Bar pressures, having a safety device for protection 120 for pressures greater than this value, relieving the internal pressure of the color-to-wet measuring cell 101, instantly depressurizing this cell 101 if the pressure exceeds this limit. This safety device for protection from overpressure 120, shown in FIG. 13, has an electronic pressure transmitter 121 installed near the connecting nozzle 122 with the color measuring cell 101, the electronic transmitter 121 for the purpose of monitoring and recording, in real time, all situations faced by the cell 101 with regard to pressurization, sending the data to the control center CCU to store the pressure history in the color measurement cell 101 with any additional safety interlocks. From the system's mechanical safety point of view, avoiding the breakage of the transparent crystal optical window 102, this safety device 120 behaves like a relief valve, having a seat and self-piloted shutter 125 through a calibrated spring 123, in order to relieve the internal pressure of the color reading cell 101 for the relief nozzle 124, whenever the pressure exceeds the maximum limit, in this case 5 BAR. If the pressure automatically exceeds the maximum limit by hydraulic displacement, the shutter recoil 125 and the consequent depressurization of the color reading cell 101 occurs, and the material circulating through the cell 101 overflows to a special depressurization line connected to the nozzle 124.

Figure 14:
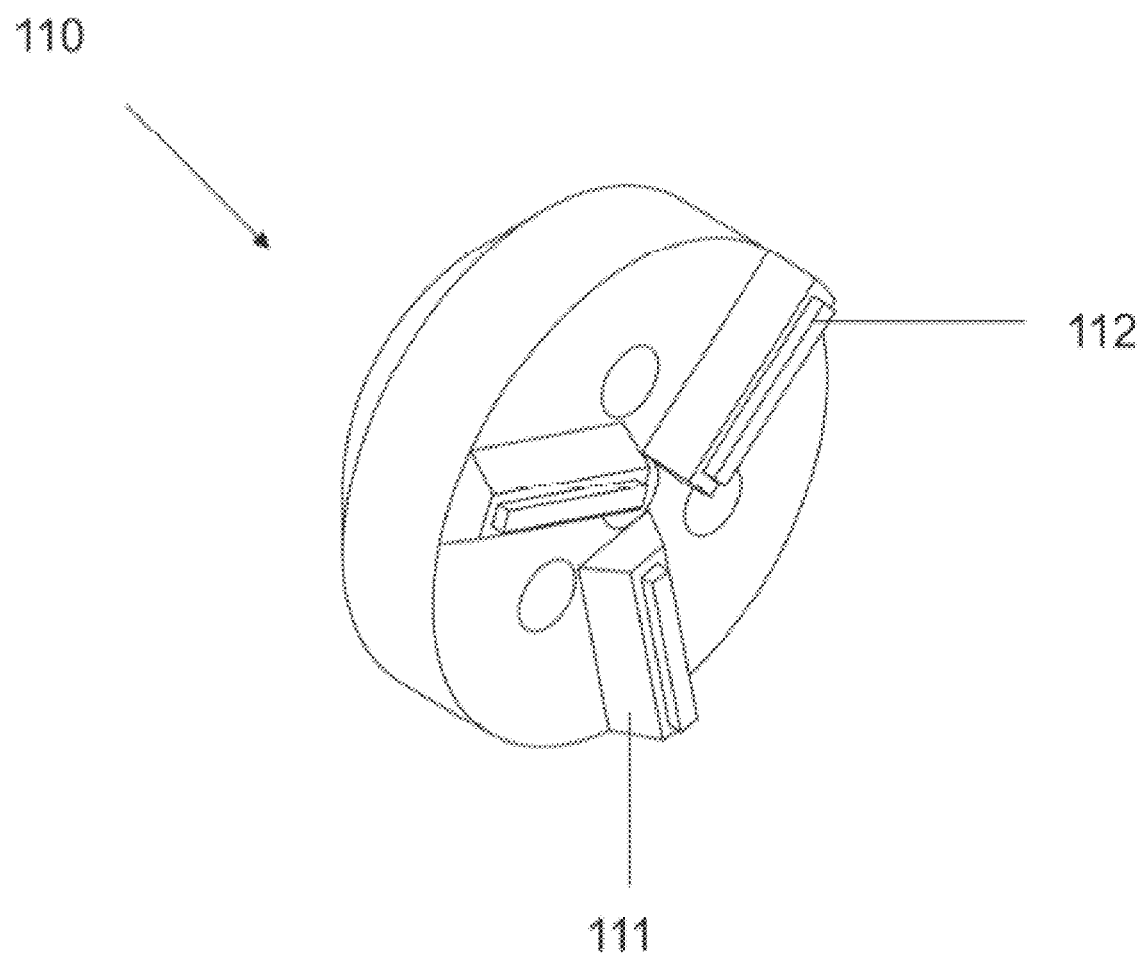
FIG. 14 presents the prospective view of the cleaning mechanism by mechanical scraping of the surface of the optical window of the color measuring cell.

For cleaning the optical measuring window 102 a self-cleaning mechanism 110 is provided that promotes the mechanical removal, by scraping, of any material that may be added to the surface of the optical window 102, being basically a set of vanes of elastomeric material, with high chemical resistance, which scrapes the inner surface of the optical reading window at each reading cycle, as shown in FIG. 14.

The self-cleaning mechanism 110 is endowed with trapezoidal profile ledges 111, in order to provide sufficient paint passage area, without generating any resistance related to load loss, and on trapezoidal profile ledges 111 perfluorelastomer vanes 112 being set, material of high chemical resistance to any type of organic solvent, the self-cleaning mechanism 110 contacting the optical window 102. The self-cleaning mechanism 110, as shown in FIG. 12C, is pushed against the internal plane of the measuring cell 102 by means of a conical profile spring 113. In this same plane, the vanes 112 contact the surface of the transparent crystal optical window 102. As a result of this reaction force, the vanes 112 are pressed against this surface, and when rotating, by the action of the rotary pneumatic actuator 120, they scrape the surface of the transparent crystal optical window 102, eliminating any residue that may have been deposited and renewing the material that circulates inside the color reading cell 101 on the surface of the optical window 102.

The optical window cleaning cycle 102 is synchronized with the spectrophotometer reading cycle 103.

Spectrophotometer calibration 103 is necessary at regular time intervals. To this end, the robotic device DR has special calibration standards installed on articulated arms 1031, 1032 and 1033 and automatically moved through control of the control center CCU, having an articulated arm 1031 for housing the white calibration standard, an articulated arm 1032 for housing the black calibration standard and an articulated arm 1033 for the green calibration standard, the arms 1031, 1032 and 1033 are activated by the control center CCU for coupling to the spectrophotometer 103.

The robotic device DR has a vertically elevated base by pneumatic cylinders 104 for spectrophotometer coupling operations 103 to calibration standards 1031, 1032 or 1033 or coupling to the color reading cell 101.

Figure 15A:
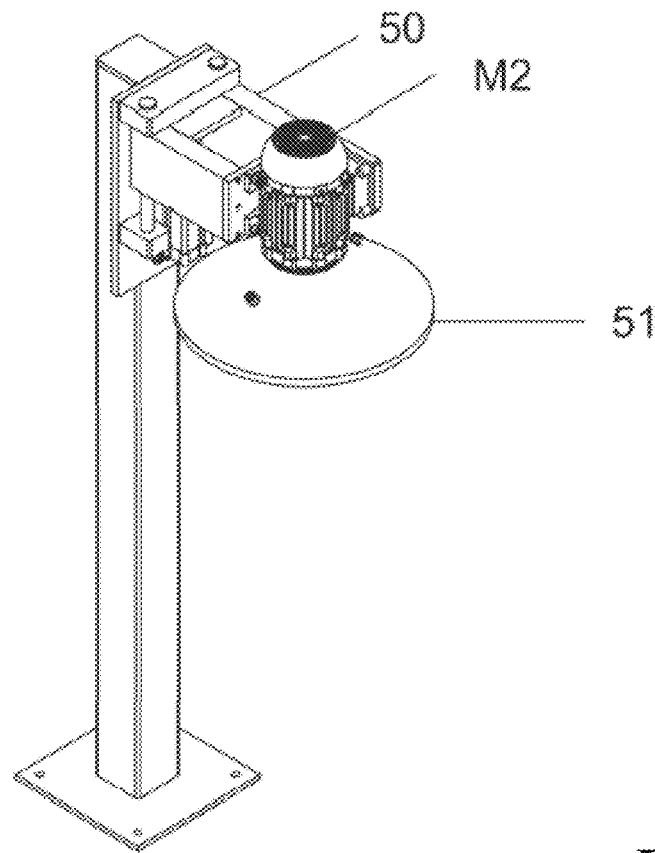
FIG. 15A presents the perspective view of a cleaning station CS and FIG. 15B shows the cutaway view of the sealing cover of the tanks.
Figure 15B:
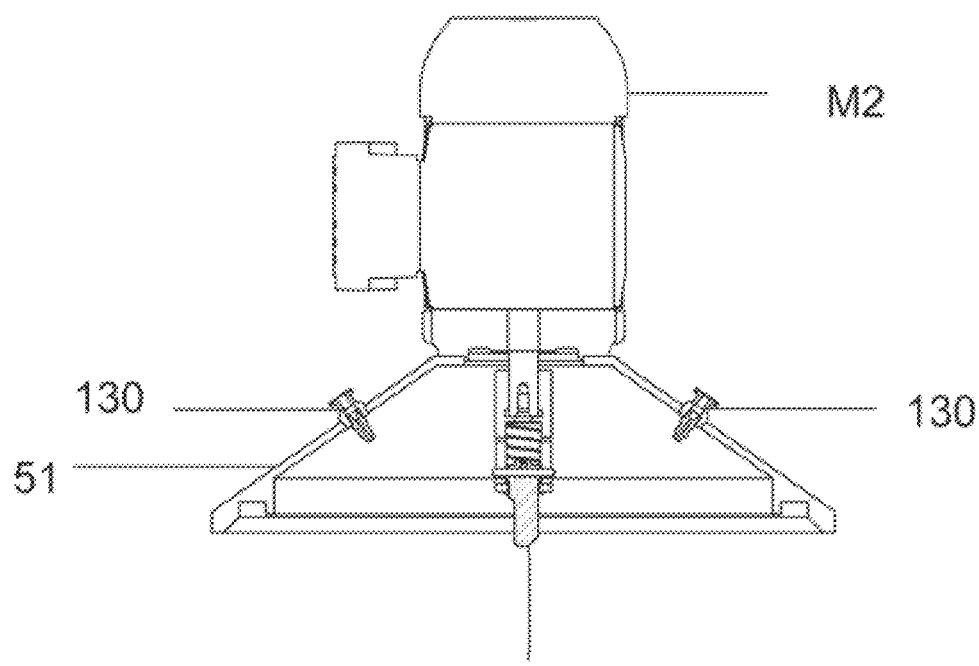

As shown in FIGS. 15A and 15B, the cleaning station CS is provided with a motor M2 with pneumatic lifting mechanism 50 flanged directly on a sealing cap 51 of the tank T, in order to avoid splashing and evaporation of material. At the time the tank T is positioned below the motor M2, the pneumatic lifting mechanism 50 automatically lowers the cover 51 and attaches it to the tank T. By means of an automatic device, during the descent and coupling of the cover 51, a traction pin 52 connected to the electric motor shaft M2 connects directly to the blade shaft 41 of the tank T, as shown in FIGS. 8B and 8C, and the cleaning station CS is able to start the cleaning process of the tank T.

On the cover 51 spray solvent mist injector nozzles 130 are installed that promote the cleaning and decontamination of the tanks T, receiving the solvent through automatic valves 141 of the cleaning manifolds 140, which will be described below.

Prior to the cleaning process, automatically the valve 42 arranged at the bottom of the tank T is connected to a pneumatic pump not represented that removes the solvent used in the tank washing process T, sending the solvent to a solvent recovery tank not shown.

In the cleaning phase, the stirring impeller 41 of the tank T is kept at low rotation, through the electric motor M2, so that the injector nozzles 130 perform simultaneous cleaning of the internal walls of the tank T and the blades 411.

Figure 16A:
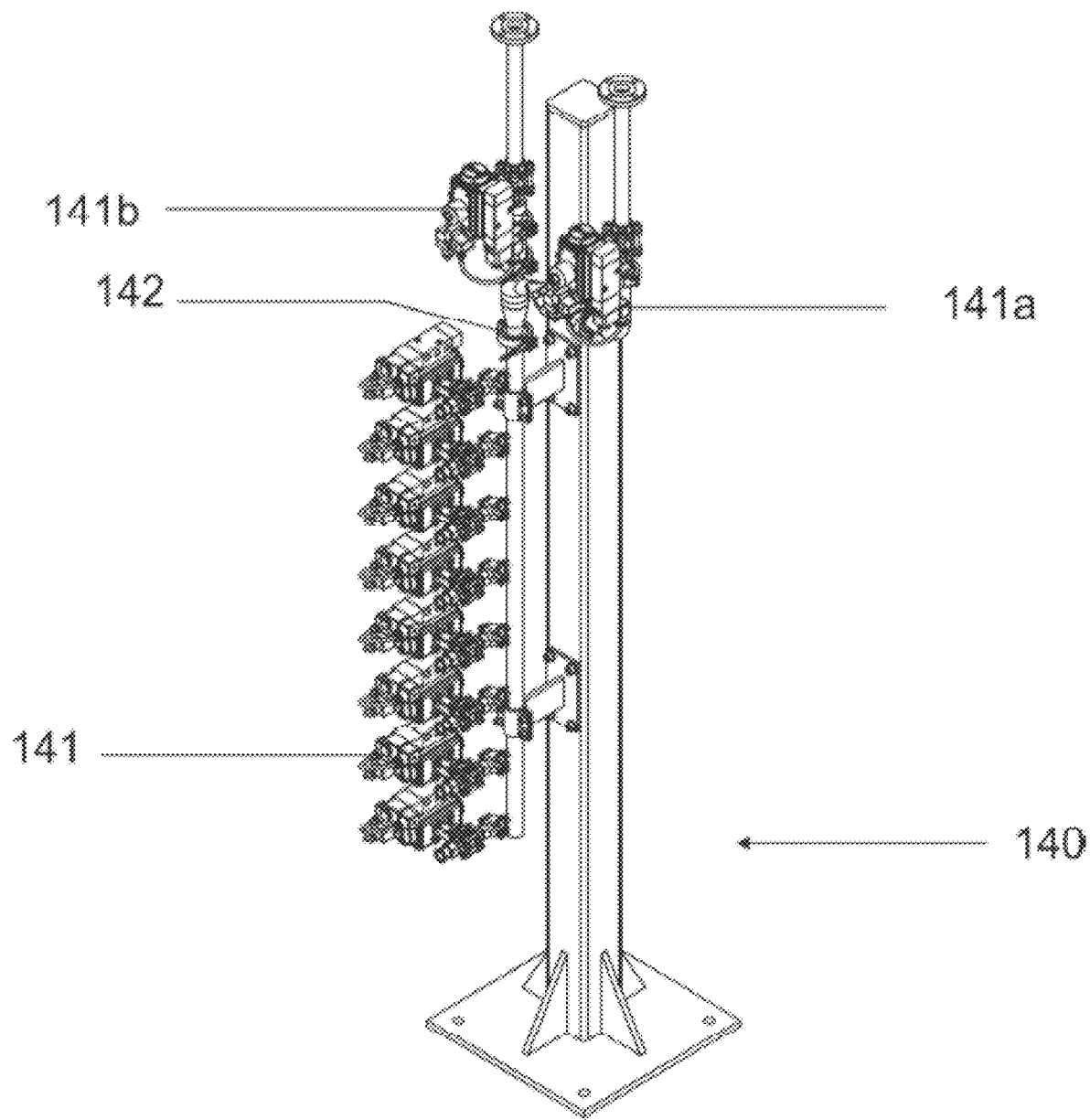
FIG. 16A shows the perspective view of the cleaning manifolds and FIG. 16B shows detailing of the automatic solvent and nitrogen intake valves integrated into the mist generator ejector.
Figure 16B:
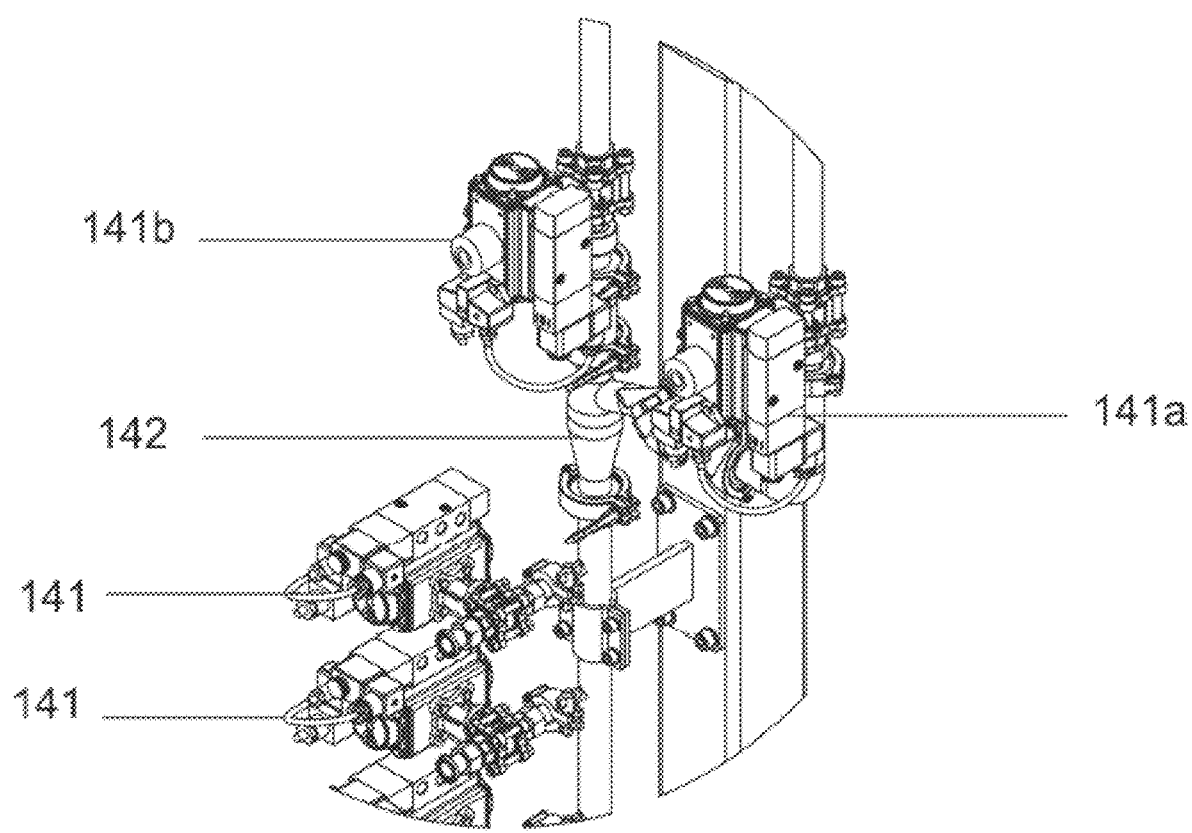

As shown in FIGS. 16A and 16B, the cleaning manifolds 140 supply a mist of cleaning solvent and nitrogen to promote a fast and efficient cleaning and decontamination of diverse units of the system after the end of each batch processed, acting in the continuous adjustment station CAS and the cleaning station CS. High-speed solvent mist produces a high kinetic energy that easily disaggregates paint residues or other materials adhered to the internal surfaces of the tanks T, cavities of the continuous line mixer 60, heat exchanger 90 and other units that contact the product.

The cleaning manifolds 140 feature a set of two automatic valves 141a and 141b designed to feed the device with solvent and nitrogen, an ejector 142 capable of producing a high turbulence mist resulting from the mixture of solvent and nitrogen at high speed and automatic dispensing valves 141 that will direct the mist flow to the surfaces to be cleaned, upon command received from the control center CCU.

The filling station FM comprises a conventional equipment for filling paints and correlates, not being the object of protection in the context of this patent of invention, and only referenced to ensure the understanding of subject matter.

The filling station FM operates continuously until the entire contents of the tank T are consumed. After this process, the tank T advances to the cleaning station CS, following the steps already described. At the same time, the filling station FM is decontaminated automatically and programmed by injecting solvent mist through its internal cavities, as previously described.

The paint production method with automatic self-adjustment of properties of the end product comprises, in a first phase, the dosing of the components of the formulation previously registered at the control center CCU, being carried out by the volumetric dosing module VDM directly in the tank T. The rotary drive mechanism RPT then positions the tank T in the mixing station MS where the contents of the tank T are homogenized for a certain pre-established time interval. Once this step is complete, the rotary drive mechanism RPT positions the tank T in the continuous adjustment station CAS. At that moment, automatically, the pneumatic lifting mechanism 50 of the cover 51 of the continuous adjustment station CAS mixer is lowered over the tank T, simultaneously to the tank bottom valve 42 being connected to the circulation pump of material in adjustment via an automatic coupling device 421. In the next step, the stirrer motor 41 of the tank T is simultaneously actuated to the circulation pump of material in adjustment until the established circulation flow rate is reached. Once the flow rate is reached, the control center CCU initiates the collection of analysis data through the multi-property meter 80 and the color measurement device on a wet basis 100. Based on the data obtained, and based on the flow of material adjusted by the pump, the control center CCU identifies and calculates the individual amount of adjustment of each component required to be dosed continuously in the continuous line mixer 60, which should integrate the correction, which will be translated into different rotations of each dosing pump of the adjustment component. With this information, the control center CCU adjusts the rotations of the dosing pumps Bda of the components, then simultaneously triggering the alignment of the three-way valves vt to the continuous line mixer 60.

At this very moment, the flow current of material in adjustment and passing through the continuous line mixer 60 begins to receive the currents of contributions of the adjustment components within the mixing chamber 601 in continuous regime, this composition being vigorously mixed by the homogenization impeller 17. Given that the dead volume of the continuous line mixer 60 is about 5 seconds in relation to the flow of material that passes through it, few seconds are needed until the material emerging from this equipment and passing through the multi-property meter 80 and the color meter on a wet basis 100 is "renewed" in its characteristics, thus enabling new readings. Under the supervision of the control center CCU, new analyses are made on a continuous basis and any corrections calculated and made in the flow of the components, iteratively, until the product meets the specifications. Throughout the period of analysis and adjustment of properties, the three-way valve vt maintains alignment for recirculation to the tank T. As soon as the specifications are met, the control center CCU activates the three-way valve alignment vt for the filling equipment, maintaining this position until the entire contents of the tank T are exhausted. Throughout this phase of the process, property controls remain active and are continuously monitored until the process is complete. At the end of this phase, the tank T is then rotated to the cleaning station CS where a solvent mist, propelled through injecting nozzles, performs internal decontamination of the tank T walls, concomitantly with the decontamination of the continuous adjustment station CAS, before the restart of a new production cycle.

After cleaning, the rotary mechanism RPT displaces the tank T for alignment with the dispensing module VDM to start a new batch.

Figure 17:
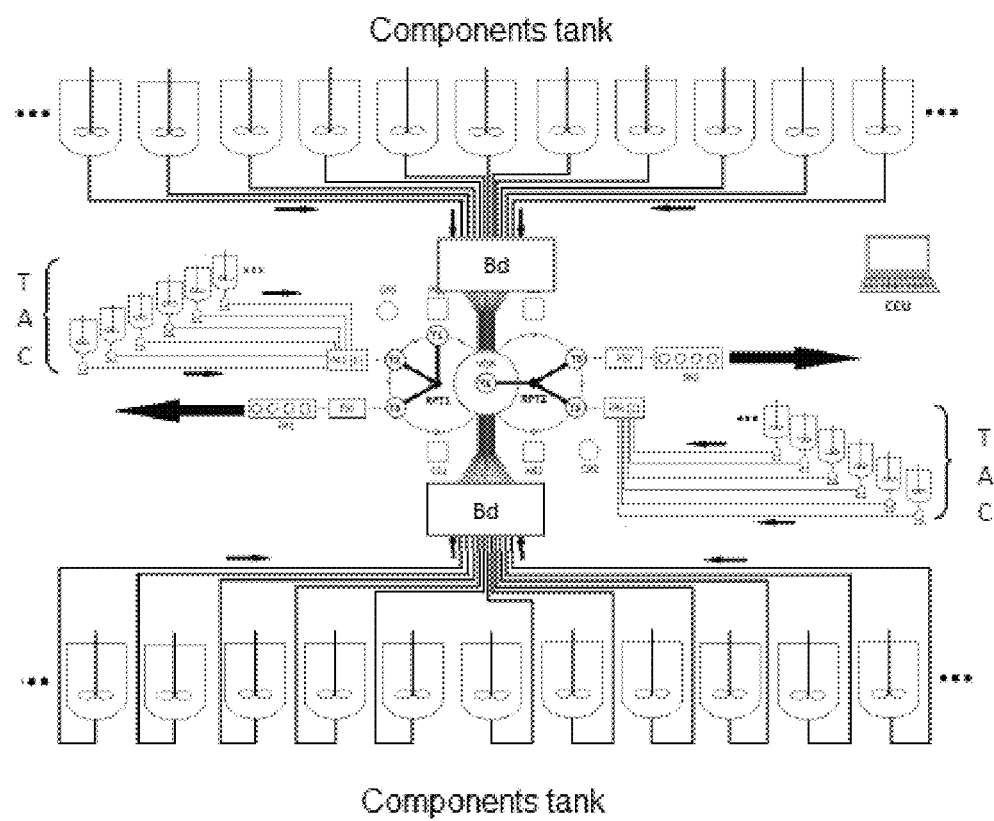
FIG. 17 presents a schematic representation of a system variation, with the prediction of a discrete adjustment station PAS alternatively to the continuous adjustment station CAS.

The continuous adjustment station CAS can be replaced by a discrete adjustment station PAS that analyzes and corrects the properties of paint batches supplied from the volumetric dosing module VDM, previously mixed through the mixing station MS, for the adjustment of properties through successive iterations and in a "discrete" quantized manner, as shown in FIG. 17.

In this configuration, two rotational units RPT1 and RPT2 are foreseen, with three tanks each T1, T2 and T3 arranged on opposite sides of the volumetric dosing module VDM, the rotational units RPT1 and RPT2 controlled through the control center CCU.

The discrete adjustment station PAS presents a unit dosing adjustment components in the "discrete" mode 701 that doses, in a quantized (non-continuous) way, the necessary adjustment materials that were estimated through the control center CCU.

Figure 18:
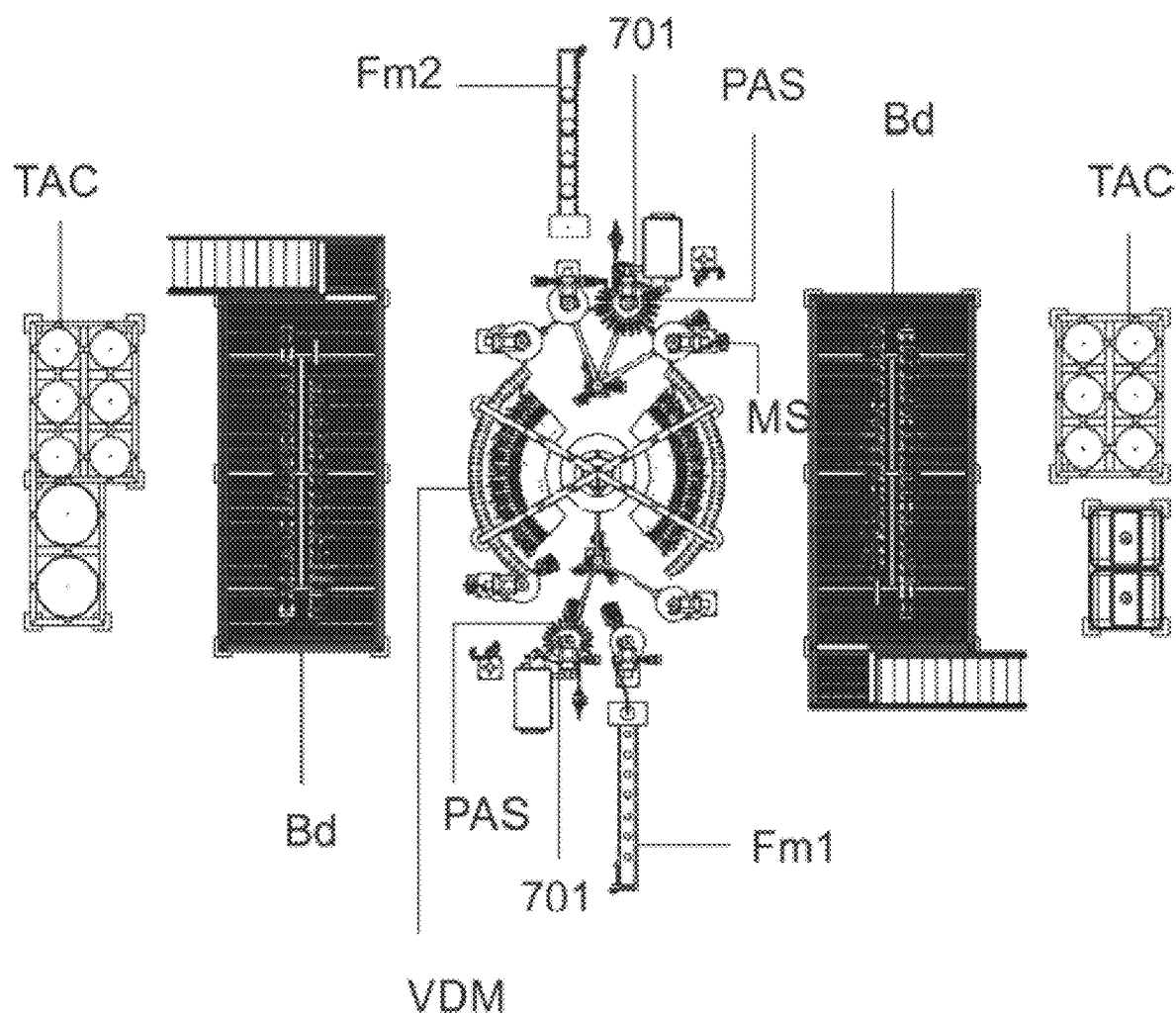
FIG. 18 shows the top view of the system with the discrete adjustment station PAS.
Figure 19A:
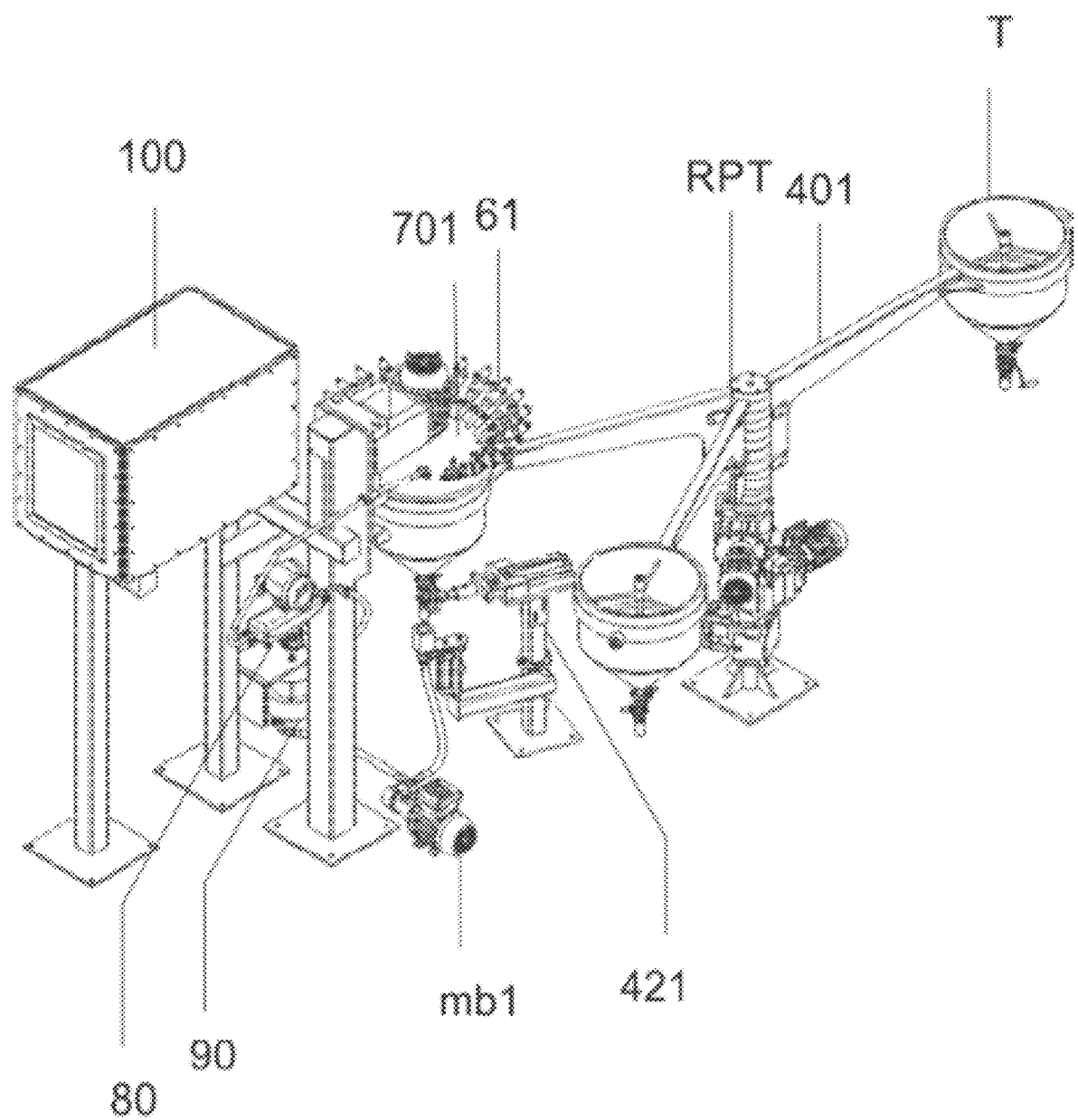
FIG. 19A shows the front perspective view of discrete adjustment stations PAS jointly with rotary tank sets RPT.
Figure 19B:
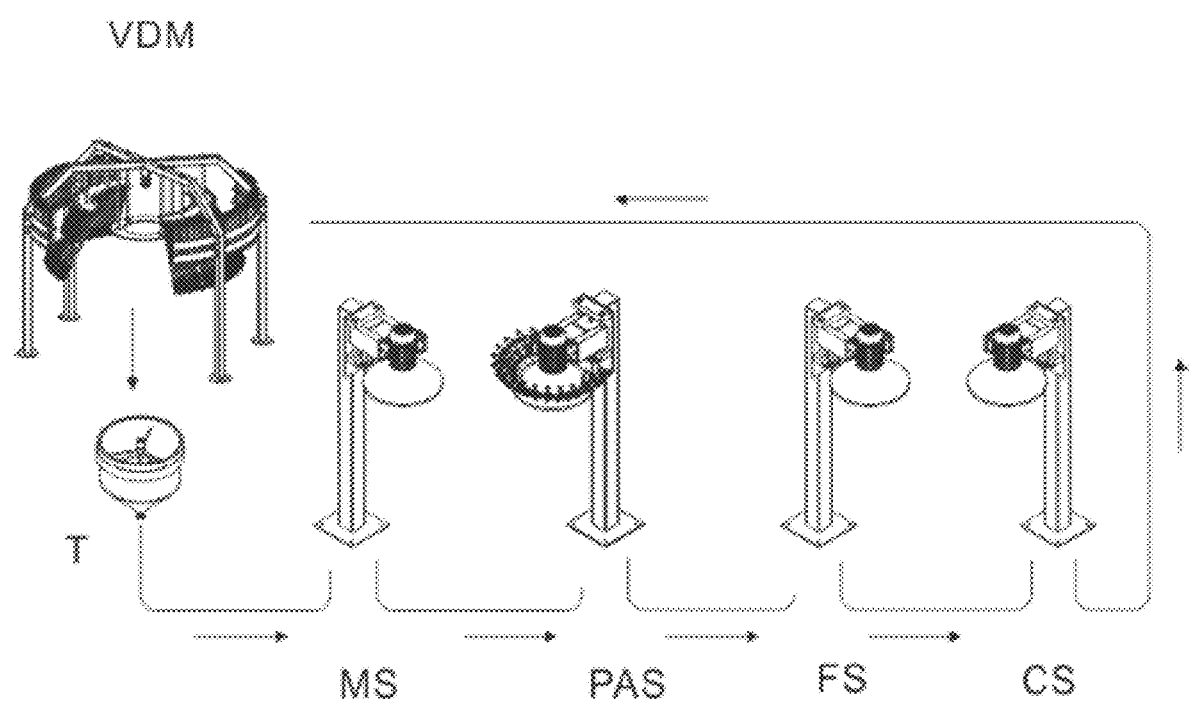
FIG. 19B presents a phase diagram of the paint production method with automatic self-adjustment of end product properties in the "discrete" operation mode.
Figure 20:
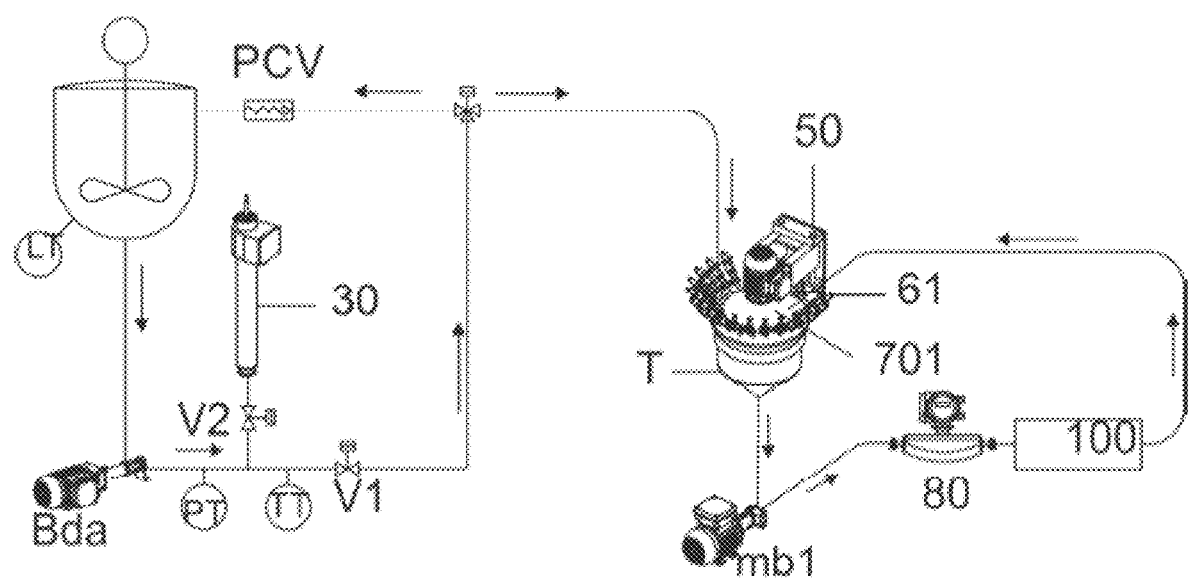
FIG. 20 presents the schematic representation of the discrete adjustment station PAS integrated into the circuit of a component to be dosed in the discrete adjustment station.

As shown in FIGS. 18, 19 and 20, similarly to the continuous adjustment station CAS, a pneumatic lifting mechanism 50 is arranged with a motor M2 and a dosing head 701 conjugated to the sealing cap 51 for positioning in the upper part of the tank T. At the moment the tank T is positioned below the motor M2, by moving the rotary mechanism RPT, the pneumatic lifting mechanism 50 automatically lowers the dosing head 701 conjugated to the sealing cap 51 and attaches it to the upper opening of the tank T. A traction pin 52 fixed to the electric motor shaft M2 connects the electric motor M2 to the homogenization impeller shaft 40.

In the "dosing head" 701 there are several dosing valves 61 of property adjustment components, the valves 61 are individually fed by dye dosing pumps Bda, according to schematic representation shown in FIG. 20. Said dosing valves 61, based on estimates made by the control center CCU, based on the contents of the tank T and the information of the measurement unit and color adjustment in wet pathway 100 and the multi-property meter viscosity/density/mass flow with Coriolis technology 80, are responsible for dosing the adjustment materials in a "quantized" (non-continuous) way into the tank T, in order to achieve the final specifications of the product.

As shown in FIG. 19A, similar to the continuous adjustment station CAS, the wet color measurement units 100 and multi-property measurement units 80 are supplied with material from the tank T, through the booster fuel pump mb1, which provides a material flow that initially travels through the heat exchanger 90, the multi-property meter 80 and, in sequence, flowing through the color measurement unit on a liquid basis 100, returning, at the end, to the tank T, configuring a "circulation ring".

According to the schematic representation of FIG. 20, a dye dosing pump Bda connects to an adjustment component tank TAC endowed with a stirring mechanism to maintain homogeneous tank content TAC in order to avoid possible sedimentation, especially in the case of pigment bases. The tank TAC has a level sensor LT. The product recirculation/injection line has pressure PT and temperature TT sensors, a self-operated pressure regulator valve PCV and a calibration mechanism 30 integrated into the dye dosing pump Bda, as described above, operating in conjunction with the V1 and V2 directional valves and with a three-way valve vt designed to recirculate the material contained in the pipes back to the storage tank TAC, or to perform the dosing head on the "dosing head" 701 of the process adjustment station in discrete mode PAS.

The operation of this process adjustment station in discrete mode PAS begins with the positioning of the tank T under the dosing head 701. At that time, automatically, the pneumatic lifting mechanism 50 of the cover 51 is lowered over the tank T. Simultaneously the bottom valve 42 of the tank T is connected to the circulating pump of material in adjustment mb1. In the next step the shaft motor 40 of the tank T is activated simultaneously to the circulating pump of adjusted material mb1. When the circulation flow established by the pump mb1, which has its speed controlled by frequency inverter, is reached, the control center CCU starts the collection of analysis data through the multi-property meter 80 and the color measurement unit on a wet basis 100. Based on the data obtained, and based on the amount of material in adjustment contained in the tank T, the control center CCU identifies and calculates the amount of adjustment of each component that will be dosed through "dosing head" 701 to make the correction. With this information, the control center CCU simultaneously measures volumetric adjustments to the inside of the tank T through the alignment of the three-way valves vt of the adjustment components and the simultaneous activation of the dosing valves 61 of the "dosing head" 701. A certain time interval is then waited for the dosed material to be homogenized inside the tank T, the recirculation of material contained in the tank T being maintained throughout this process and uninterruptedly through the circulation pump mb1. After a certain period, and in a totally automatic way, a new collection of the analysis data, through the sensors of line properties mentioned above, is performed for verification as to the characteristics of the material in the tank T. If the material has not yet met the specifications, successive iterations are performed until the material contained in the tank fully meets the specifications and then the activity of this process adjustment station in discrete mode PAS is completed, releasing the tank T for displacement to the filling station FM.

Figure 21:
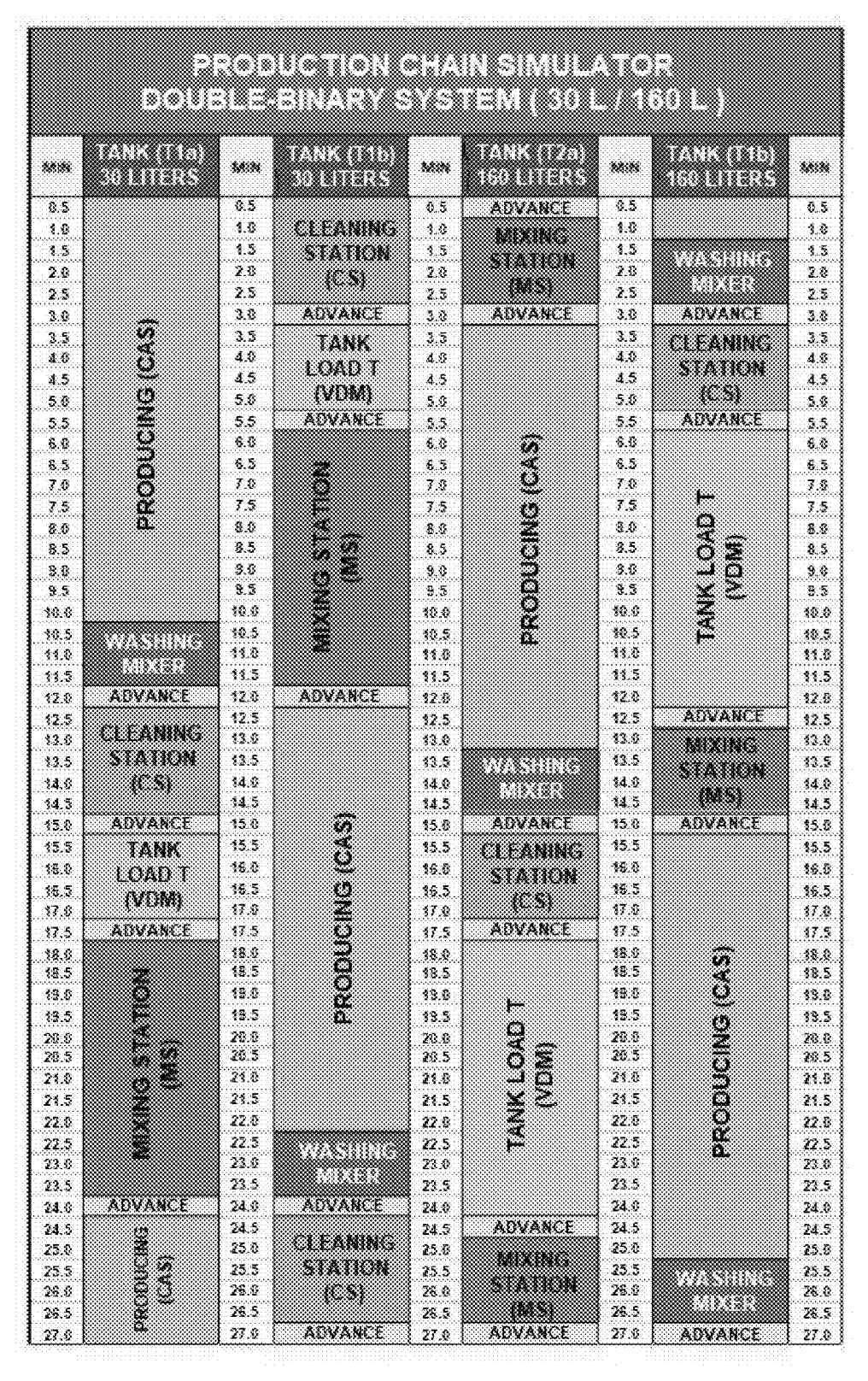

As shown in FIG. 21, the processing steps of a Volumetric Dispensing Module with two Processing Modules are simulated. Due to ease of representation, the tank T1a had its production phase (adjustment/filler/pre-cleaning) interrupted at the $27^{th}$ minute; however, this cycle would end only at the $35^{th}$ minute, when a new cycle begins.

Regarding the stage [producing] for the set of tanks T1a and T1b, which use the same filling station FM1, it can be noted that the tank T1a is dispatching material to the filler from 0.5 minutes to 10 minutes. From the $10^{th}$ minute to 11.5 minutes, the station is in [washing mixer], which corresponds to the washing of the Continuous Processing Station CAS1 and the filling station FM1, and in this case, for a period of 1.0 minute, the filling operation is paralyzed. From the instant [12.5 minutes] the filling of material from the tank T1a begins again in the filling station FM1, of the continuous adjustment station CAS1.

This cycle of 10.0 minutes filling and 1.0 minute washing is repeated "ad infinitum" for each station, and in the set and on average, every 11.0 minutes two distinct batches of production are dispatched, one coming from the set of tanks T1a and T1b and another from the set of tanks T2A and T2b.

Therefore, by the time the first tank completes its processing in the continuous processing module CAS, the second tank will have already completed all other steps and will be waiting to be processed in the continuous processing module CAS, making the manufacturing process virtually continuous and with high productivity.

With the concept of the "rotary tank" and a special dimensioning of the equipment, the process is capacitated so that while one of the rotary tanks T is stationary at the station of the continuous processing units during the period of adjustment of properties and filling, all other steps (cleaning, dosing and mixing) are being fulfilled by the other rotary tank T.

The concept of the combination of two sets of rotary tanks increases productivity in an extremely significant way, since the paint production system, object of this patent of invention, with a single set of rotary tanks T, does not occupy the entire capacity of the Volumetric Dosing VDM, and the investment for the installation of another set of rotary tanks added to another module of mixing stations MS, continuous adjustment station CAS and cleaning station CS becomes of little relevance when compared to the investment required for all infrastructure required for the installation of a single set of rotary tanks T.

The invention claimed is:

1. A paint production system with automatic self-adjustment of end product properties comprising:
   a control center configured to send commands from a set of instructions in a computer program;
   at least one continuous processing module; and
   a volumetric dosing module comprising:
      an image acquisition unit arranged above arms and configured to record activation of the arms by the commands received from the control center which, through digital image processing, is configured to perform confirmations of positioning and interlocking of the arms and the opening and closing of dosing valves, one each located on a free end of at least a portion of the arms;
      wherein each of at least a portion of the arms further comprise a lever mechanism driven by a pneumatic actuator configured to move the respective arm by the commands received from the control center;
      wherein the dosing valves are configured to release a specified amount of a component stored in a tank, by means of a dosing pump, into a tank of the continuous processing module;
   wherein each continuous processing module comprises a rotary mechanism with an indexing unit driven by the center which, after activation, rotates a central shaft, to which radial arms rotated by gearmotors are coupled;
   wherein at the free end of the radial arms the tank is positioned into which the specified amount of the component is dosed into the volumetric dosing module;
   wherein the tank comprises an impeller shaft with a stirrer and a drain valve; and
   wherein the tank is positioned sequentially:
      in a mixing station comprising:
         a mixing station pneumatic lifting mechanism with a mixing station motor and a mixing station sealing cap for positioning in an upper part of the tank; and
         a mixing station traction pin fixed to the mixing station motor that connects the mixing station motor to the impeller shaft;
      in a continuous property adjustment station comprising:
         a continuous property adjustment station pneumatic lifting mechanism with a continuous property adjustment station motor and a continuous property adjustment station sealing cap for positioning in the upper part of the tank; and
         a continuous property adjustment station traction pin fixed to the continuous property adjustment station motor connecting the continuous property adjustment station motor the homogenization impeller shaft and a material circulation pump in adjustment connected to the drain valve of the tank through an automatic coupling device for product flow for the tank, followed by data collection by the control center through a circuit containing a continuous line mixer, a multi-property meter with a Coriolis effect operating principle, a wet color measurement and adjustment unit and a three-way valve for material targeting in adjustment for return to the tank or for directing to a filling station when the product has met formulation specifications; and
      in a cleaning station comprising:
         a cleaning station pneumatic lifting mechanism with a cleaning station motor and a cleaning station sealing cap for positioning on the upper part of the tank; and
         a cleaning station traction pin fixed to the cleaning station motor connecting the cleaning station motor to the impeller shaft and solvent injector nozzles arranged in the cleaning station sealing cap that receive the solvent through automatic valves of of cleaning manifolds, with the drain valve of the tank connected to a pneumatic pump for solvent removal.

2. The system according to claim 1, wherein the control center is further configured to activate the arms equivalent to the components to be dosed in the tank, followed by alignment of the dosing valves for the passage of the flow of the component stored in a supply tank into the tank of the continuous processing module until the quantity of the component specified in the formulation is reached.

3. The system according to claim 1, wherein each dosing valve presents a nozzle that receives the component stored in a supply tank, by means of the dosing pump, and a dosing nozzle that expels the total flow of product transferred by the dosing pump directly into the tank, while the pneumatic actuator is receded.

4. The system according to claim 3, wherein each dosing valve provides the recirculation of the component received from the supply tank when the pneumatic actuator is advanced, the component returning to the supply tank through an output nozzle.

5. The system according to claim 1, wherein each dosing pumps that feeds the volumetric dosing module are installed on two shared central shafts driven by a single electric motor, a second shaft of the two shared central shafts being coupled and synchronized to a first shaft of the two shared central shafts through a planetary type reducer and set of sprockets and roller chains and a transmission box, presenting a digital encoder that counts the number of revolutions made by the two shared central shafts, relaying this data to the control center.

6. The system according to claim 5, wherein each dosing pump is connected to the respective one of the two shared central shafts through a pneumatically actuated gearing assembly by means of an actuator that moves a drive arm of the dosing pump's gearing mechanism, which propels an advance fork of the dosing pump's gearing mechanism which in turn pushes a coupling device of the dosing pump forward such that "male" type grooved furrows fit into "female" type grooved furrows of the coupling device of the dosing pump, engaging the coupling device and the advance fork, transferring the traction of the two shared central shafts to the dosing pump.

7. The system according to claim 5 further comprising a calibration unit connected with a discharge line of the dosing pumps by a nozzle;
wherein the calibration unit presents a metal tube, a non-magnetic metal sleeve where magnetic position sensors are fixed, a plunger internal to the non-magnetic metal sleeve fitted with sealing gaskets and fitted with a magnet positioned between the sealing gaskets that sensitizes the magnetic position sensors.

8. The system according to claim 1, wherein the components are routed to the continuous line mixer driven by an electric motor and comprising a mixing chamber with a homogenization impeller and an external sleeve for integral cooling of the mixing chamber; and
wherein the mixing chamber comprises radial injection valves for continuous flow of components.

9. The system according to claim 8, wherein each radial injection valve comprises a nozzle and at an opposite end a shutter connected to the mixing chamber of the continuous line mixer; and
wherein the shutter is attached to a valve shaft tensioned by a conical spring, and a blocking shaft is fixed to a sliding pneumatic mechanism activated when intended to release the valve shaft during the dosing process, by intake of compressed air in a pneumatic connection.

10. The system according to claim 1 further comprising a heat exchanger for temperature conditioning of the product in adjustment, from rotary tanks;
wherein the heat exchanger comprises cylindrical surfaces with a helical profile channel surrounded by an internal cylinder and an external cylinder, between the internal and external cylinders circulating a refrigerant taken in through a nozzle in a "mirror" of the heat exchanger and initially traveling through the helical profile channel of the inner cylinder until it reaches the mirror of the heat exchanger where the refrigerant flow is directed to the helical profile channel of the outer cylinder, through which the cooling fluid is directed and contained through an external housing of the heat exchanger, thus returning again to the "mirror" of the heat exchanger, and this path fully sealed in relation to an intermediate cylinder through which the product in adjustment of temperature traverses the heat exchanger.

11. The system according to claim 1 further comprising a robotic device comprising a computer control unit connected to the control center;
wherein the robotic device comprises a vertically elevated base by pneumatic cylinders for the coupling of a spectrophotometer to housings of white, black and green calibration standards installed on articulated arms or for coupling to a wet color measuring cell of an optical window in transparent crystal in which the spectrophotometer is externally coupled.

12. The system according to claim 11, wherein the wet color measuring cell is connected to a safety device for protection from over-pressure comprising an electronic pressure transmitter configured to send data to the control center and a self-piloted shutter through a calibrated spring that relieves the internal pressure of the wet color measuring cell to a relief nozzle with the overflow material to a special depressurization line connected to the relief nozzle.

13. The system according to claim 1 further comprising a self-cleaning mechanism of a measuring cell of an optical window in transparent crystal is provided that presents trapezoidal profile ledges where perfluorelastomer vanes are set, the self-cleaning mechanism being pushed against an internal plane of the measuring cell by means of a conical profile spring.

14. The system according to claim 1, wherein the cleaning manifolds comprise two automatic valves designed to feed the device with solvent and nitrogen, an ejector and automatic dispensing valves that will direct the flow of mist to surfaces, upon command received from the control center.

15. A paint production method with automatic self-adjustment of end product properties using the system claimed in claim 1 comprising:
a) dosing of the components of the formulation previously registered at the control center by the volumetric dispensing module directly in the tank;
b) rotary mechanism drive for tank positioning at the mixing station;
c) homogenization of the contents of the tank in the mixing station for a certain time interval pre-established at the control center;
d) rotary mechanism drive for tank positioning at the continuous property adjustment station;
e) lowering the sealing cap into the upper tank opening by the pneumatic lifting mechanism simultaneously to the tank bottom valve to be connected to the circulating pump of material in adjustment via an automatic coupling device;
f) motor drive of the stirrer of the tank and the circulation pump of material in adjustment until the circulation flow established at the control center is reached;
g) collection of data of the property of the product deposited in the tank by means of the multi-property meter and the color measurement device on a wet basis;
h) data collected in step and the flow of material adjusted by the pump sent to the control center to calculate the individual amount of adjustment of each component required to be dosed continuously in the continuous line mixer;
i) adjustment of the rotation of the dosing pumps of the components by the control center and simultaneous activation of the alignment of the three-way valves to the continuous line mixer;

j) collection of data from the product property deposited in the tank by means of the multi-property meter and the color measurement device on a wet basis by aligning the three-way valve for recirculation in the tank to the control center to acknowledge the achievement of the specifications;

k) alignment of the three-way valve to the filling station;

l) Rotary mechanism drive for tank positioning in the cleaning station jointly with the cleaning of the continuous adjustment station; and m) rotary mechanism displaces the tank for alignment with the volumetric dispensing module to start a new batch.

16. A paint production system with automatic self-adjustment of end product properties comprising:

a) a control center that sends commands from a set of instructions in a computer program;

b) a volumetric dosing module that presents:

b.1) an image acquisition unit arranged above the arms to record the activation of the arms from the command received from the control center which, through digital image processing, performs the confirmations of positioning and interlocking of the dosing arms and the opening and closing of the dosing valves;

b.2) a set of arms endowed with a lever mechanism driven by a pneumatic actuator that moves the arm by command received from the control center, the arms that present at the free end a dosing valve which releases the specified amount of the component stored in a tank, by means of a dosing pump, into the tank of a continuous processing module;

c) at least one continuous processing module endowed with two rotational units and, each rotational unit and with three tanks, the rotational unit with an indexing unit activated by the control center which, after activation, rotates a central shaft, to which radial arms rotated by gearmotors are coupled, at whose free end of the radial arms the tank is positioned, where the dosed components in the volumetric dosing module are released, the tank provided with an impeller shaft with stirrer and a flow valve, the tank positioned sequentially:

c.1) in a mixing station endowed with a pneumatic lifting mechanism with a motor and a sealing cap for positioning in the upper part of the tank, including a traction pin fixed to the electric motor shaft that connects the electric motor to the homogenization impeller shaft;

c.2) in a discrete continuous property adjustment station endowed with a pneumatic lifting mechanism with a motor, a traction pin fixed to the electric motor shaft that connects to the homogenization impeller shaft and a dosing head combined with the sealing cap, the dosing head endowed with dosing valves of property adjustment components individually fed by dye dosing pumps from estimates made by the control center, based on the contents of the tank and the information of the measurement unit and color adjustment in wet path and the multi-property meter;

c.3) in a cleaning station endowed with a pneumatic lifting mechanism with a motor and a sealing cap for positioning on the upper part of the tank, including a traction pin fixed to the electric motor shaft connecting the electric motor to the homogenization impeller shaft and solvent injector nozzles arranged in the cover that receive the solvent through automatic valves of the cleaning manifolds, with the drain valve of the tank connected to a pneumatic pump for solvent removal.

17. A paint production method with automatic self-adjustment of end product properties using the system of claim 16 comprising:

a) dosing of the components of the formulation previously recorded at the control center by the volumetric dispensing module directly in the tank;

b) rotary mechanism drive for tank positioning at mixing station;

c) homogenization of the contents of the tank in the mixing station for a certain time interval pre-established at the control center;

d) rotary mechanism drive for positioning the tank at the discrete property adjustment station;

e) cover is lowered into the upper opening of the tank by the pneumatic lifting mechanism together with the dosing head and simultaneously to the tank bottom valve to be connected to the circulating pump of material in adjustment via an automatic coupling device;

f) motor drive of the stirrer of the tank and the circulation pump of material in adjustment until the circulation flow established at the control center is reached;

g) data collection on property of product deposited in the tank by means of the multi-property meter and the color measurement device on a wet basis;

h) data collected in step and the flow of material adjusted by the pump sent to the control center to calculate the individual adjustment quantity of each component required to be dosed continuously in the continuous line mixer;

i) adjusting the rotation of the dosing pumps of the components by the control center and simultaneous activation of the alignment of the three-way valves to the continuous line mixer;

j) data collection on property of the product deposited in the tank by means of the multi-property meter and the color measurement device on a wet basis by aligning the three-way valve for recirculation in the tank to the control center to acknowledge the achievement of the specifications;

k) three-way valve alignment for the filling station;

l) Rotary mechanism drive for tank positioning at the cleaning station jointly with the cleaning of the continuous adjustment station; and m) rotary mechanism displaces the tank for alignment with the volumetric dispensing module to start a new batch.

* * * * *